US011567573B2

(12) United States Patent
Berenzweig et al.

(10) Patent No.: US 11,567,573 B2
(45) Date of Patent: Jan. 31, 2023

(54) NEUROMUSCULAR TEXT ENTRY, WRITING AND DRAWING IN AUGMENTED REALITY SYSTEMS

(71) Applicant: META PLATFORMS TECHNOLOGIES, LLC, Menlo Park, CA (US)

(72) Inventors: Adam Berenzweig, Brooklyn, NY (US); Daniel Wetmore, Brooklyn, NY (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 16/577,352

(22) Filed: Sep. 20, 2019

(65) Prior Publication Data

US 2020/0097082 A1 Mar. 26, 2020

Related U.S. Application Data

(60) Provisional application No. 62/734,138, filed on Sep. 20, 2018.

(51) Int. Cl.
*G06F 3/01* (2006.01)
*G06T 19/00* (2011.01)
(Continued)

(52) U.S. Cl.
CPC .......... *G06F 3/015* (2013.01); *G02B 27/017* (2013.01); *G06F 3/005* (2013.01); *G06F 3/017* (2013.01);
(Continued)

(58) Field of Classification Search
CPC .......... G06F 3/015; G06F 3/005; G06F 3/017; G06F 3/014; G06F 3/011; G02B 27/017;
(Continued)

(56) References Cited

U.S. PATENT DOCUMENTS 1,411,995 A 4/1922 Dull
3,580,243 A 5/1971 Johnson
(Continued)

FOREIGN PATENT DOCUMENTS

CA 2902045 A1 8/2014
CA 2921954 A1 2/2015
(Continued)

OTHER PUBLICATIONS

Extended European Search Report for European Application No. EP 17835111.0 dated Nov. 21, 2019.
(Continued)

*Primary Examiner* — Daniel W Parcher
(74) *Attorney, Agent, or Firm* — FisherBroyles, LLP

(57) ABSTRACT

Methods and systems for providing input to an augmented reality system or an extended reality system based, at least in part, on neuromuscular signals. The methods and systems comprise detecting, using one or more neuromuscular sensors arranged on one or more wearable devices, neuromuscular signals from a user; determining that a computerized system is in a mode configured to provide input including text to the augmented reality system; identifying based, at least in part, on the neuromuscular signals and/or information based on the neuromuscular signals, the input, wherein the input is further identified based, at least in part, on the mode; and providing the identified input to the augmented reality system.

31 Claims, 11 Drawing Sheets

(51) Int. Cl.
*G02B 27/01* (2006.01)
*G06F 3/00* (2006.01)

(52) U.S. Cl.
CPC .... *G06T 19/006* (2013.01); *G02B 2027/0138* (2013.01)

(58) Field of Classification Search
CPC ...... G02B 2027/0138; G02B 2027/014; G02B 2027/0187; G06T 19/006
See application file for complete search history.

(56) References Cited

U.S. PATENT DOCUMENTS

| | | | |
|---|---|---|---|
| 3,620,208 A | 11/1971 | Wayne et al. | |
| 3,735,425 A | 5/1973 | Hoshall et al. | |
| 3,880,146 A | 4/1975 | Everett et al. | |
| 4,055,168 A | 10/1977 | Miller et al. | |
| 4,602,639 A | 7/1986 | Hoogendoorn et al. | |
| 4,705,408 A | 11/1987 | Jordi | |
| 4,817,064 A | 3/1989 | Milles | |
| 4,896,120 A | 1/1990 | Kamil | |
| 5,003,978 A | 4/1991 | Dunseath, Jr. | |
| D322,227 S | 12/1991 | Warhol | |
| 5,081,852 A | 1/1992 | Cox | |
| 5,251,189 A | 10/1993 | Thorp | |
| D348,660 S | 7/1994 | Parsons | |
| 5,445,869 A | 8/1995 | Ishikawa et al. | |
| 5,462,065 A | 10/1995 | Cusimano | |
| 5,482,051 A | 1/1996 | Reddy et al. | |
| 5,605,059 A | 2/1997 | Woodward | |
| 5,625,577 A | 4/1997 | Kunii et al. | |
| 5,683,404 A | 11/1997 | Johnson | |
| 6,005,548 A | 12/1999 | Latypov et al. | |
| 6,009,210 A | 12/1999 | Kand | |
| 6,032,530 A | 3/2000 | Hock | |
| 6,066,794 A | 5/2000 | Longo | |
| 6,184,847 B1 | 2/2001 | Fateh et al. | |
| 6,238,338 B1 | 5/2001 | DeLuca et al. | |
| 6,244,873 B1 | 6/2001 | Hill et al. | |
| 6,377,277 B1 | 4/2002 | Yamamoto | |
| D459,352 S | 6/2002 | Giovanniello | |
| 6,411,843 B1 | 6/2002 | Zarychta | |
| 6,487,906 B1 | 12/2002 | Hock | |
| 6,510,333 B1 | 1/2003 | Licata et al. | |
| 6,527,711 B1 | 3/2003 | Stivoric et al. | |
| 6,619,836 B1 | 9/2003 | Silvant et al. | |
| 6,658,287 B1 | 12/2003 | Litt et al. | |
| 6,720,984 B1 | 4/2004 | Jorgensen et al. | |
| 6,743,982 B2 | 6/2004 | Biegelsen et al. | |
| 6,771,294 B1 | 8/2004 | Pulli et al. | |
| 6,774,885 B1 | 8/2004 | Even-Zohar | |
| 6,807,438 B1 | 10/2004 | Brun Del Re et al. | |
| D502,661 S | 3/2005 | Rapport | |
| D502,662 S | 3/2005 | Rapport | |
| 6,865,409 B2 | 3/2005 | Getsla et al. | |
| D503,646 S | 4/2005 | Rapport | |
| 6,880,364 B1 | 4/2005 | Vidolin et al. | |
| 6,901,286 B1 | 5/2005 | Sinderby et al. | |
| 6,927,343 B2 | 8/2005 | Watanabe et al. | |
| 6,942,621 B2 | 9/2005 | Avinash et al. | |
| 6,965,842 B2 | 11/2005 | Rekimoto | |
| 6,972,734 B1 | 12/2005 | Ohshima et al. | |
| 6,984,208 B2 | 1/2006 | Zheng | |
| 7,022,919 B2 | 4/2006 | Brist et al. | |
| 7,086,218 B1 | 8/2006 | Pasach | |
| 7,089,148 B1 | 8/2006 | Bachmann et al. | |
| D535,401 S | 1/2007 | Travis et al. | |
| 7,173,437 B2 | 2/2007 | Hervieux et al. | |
| 7,209,114 B2 | 4/2007 | Radley-Smith | |
| D543,212 S | 5/2007 | Marks | |
| 7,265,298 B2 | 9/2007 | Maghribi et al. | |
| 7,271,774 B2 | 9/2007 | Puuri | |
| 7,333,090 B2 | 2/2008 | Tanaka et al. | |
| 7,351,975 B2 | 4/2008 | Brady et al. | |
| 7,450,107 B2 | 11/2008 | Radley-Smith | |
| 7,491,892 B2 | 2/2009 | Wagner et al. | |
| 7,517,725 B2 | 4/2009 | Reis | |
| 7,558,622 B2 | 7/2009 | Tran | |
| 7,574,253 B2 | 8/2009 | Edney et al. | |
| 7,580,742 B2 | 8/2009 | Tan et al. | |
| 7,596,393 B2 | 9/2009 | Jung et al. | |
| 7,618,260 B2 | 11/2009 | Daniel et al. | |
| 7,636,549 B2 | 12/2009 | Ma et al. | |
| 7,640,007 B2 | 12/2009 | Chen et al. | |
| 7,660,126 B2 | 2/2010 | Cho et al. | |
| 7,761,390 B2 | 7/2010 | Ford | |
| 7,787,946 B2 | 8/2010 | Stahmann et al. | |
| 7,805,386 B2 | 9/2010 | Greer | |
| 7,809,435 B1 | 10/2010 | Ettare et al. | |
| 7,844,310 B2 | 11/2010 | Anderson | |
| 7,870,211 B2 | 1/2011 | Pascal et al. | |
| 7,901,368 B2 | 3/2011 | Flaherty et al. | |
| 7,925,100 B2 | 4/2011 | Howell et al. | |
| 7,948,763 B2 | 5/2011 | Chuang | |
| D643,428 S | 8/2011 | Janky et al. | |
| D646,192 S | 10/2011 | Woode | |
| 8,054,061 B2 | 11/2011 | Prance et al. | |
| D654,622 S | 2/2012 | Hsu | |
| 8,170,656 B2 | 5/2012 | Tan et al. | |
| 8,179,604 B1 | 5/2012 | Prada Gomez et al. | |
| 8,188,937 B1 | 5/2012 | Amafuji et al. | |
| 8,190,249 B1 | 5/2012 | Gharieb et al. | |
| D661,613 S | 6/2012 | Demeglio | |
| 8,203,502 B1 | 6/2012 | Chi et al. | |
| 8,207,473 B2 | 6/2012 | Axisa et al. | |
| 8,212,859 B2 | 7/2012 | Tang et al. | |
| 8,311,623 B2 | 11/2012 | Sanger | |
| 8,348,538 B2 | 1/2013 | Van Loenen et al. | |
| 8,351,651 B2 | 1/2013 | Lee | |
| 8,355,671 B2 | 1/2013 | Kramer et al. | |
| 8,384,683 B2 | 2/2013 | Luo | |
| 8,389,862 B2 | 3/2013 | Arora et al. | |
| 8,421,634 B2 | 4/2013 | Tan et al. | |
| 8,427,977 B2 | 4/2013 | Workman et al. | |
| D682,727 S | 5/2013 | Bulgari | |
| 8,435,191 B2 | 5/2013 | Barboutis et al. | |
| 8,437,844 B2 | 5/2013 | Syed Momen et al. | |
| 8,447,704 B2 | 5/2013 | Tan et al. | |
| 8,467,270 B2 | 6/2013 | Gossweiler, III et al. | |
| 8,469,741 B2 | 6/2013 | Oster et al. | |
| 8,484,022 B1 | 7/2013 | Vanhoucke | |
| D689,862 S | 9/2013 | Liu | |
| 8,591,411 B2 | 11/2013 | Banet et al. | |
| D695,454 S | 12/2013 | Moore | |
| 8,620,361 B2 | 12/2013 | Bailey et al. | |
| 8,624,124 B2 | 1/2014 | Koo et al. | |
| 8,702,629 B2 | 4/2014 | Giuffrida et al. | |
| 8,704,882 B2 | 4/2014 | Turner | |
| 8,718,980 B2 | 5/2014 | Garudadri et al. | |
| 8,743,052 B1 | 6/2014 | Keller et al. | |
| 8,744,543 B2 | 6/2014 | Li et al. | |
| 8,754,862 B2 | 6/2014 | Zaliva | |
| 8,777,668 B2 | 7/2014 | Ikeda et al. | |
| D716,457 S | 10/2014 | Brefka et al. | |
| D717,685 S | 11/2014 | Bailey et al. | |
| 8,879,276 B2 | 11/2014 | Wang | |
| 8,880,163 B2 | 11/2014 | Barachant et al. | |
| 8,883,287 B2 | 11/2014 | Boyce et al. | |
| 8,890,875 B2 | 11/2014 | Jammes et al. | |
| 8,892,479 B2 | 11/2014 | Tan et al. | |
| 8,895,865 B2 | 11/2014 | Lenahan et al. | |
| 8,912,094 B2 | 12/2014 | Koo et al. | |
| 8,914,472 B1 | 12/2014 | Lee et al. | |
| 8,922,481 B1 | 12/2014 | Kauffmann et al. | |
| 8,970,571 B1 | 3/2015 | Wong et al. | |
| 8,971,023 B2 | 3/2015 | Olsson et al. | |
| 9,018,532 B2 | 4/2015 | Wesselmann et al. | |
| 9,037,530 B2 | 5/2015 | Tan et al. | |
| 9,086,687 B2 | 7/2015 | Park et al. | |
| 9,092,664 B2 | 7/2015 | Forutanpour et al. | |
| D736,664 S | 8/2015 | Paradise et al. | |
| 9,146,730 B2 | 9/2015 | Lazar | |
| D741,855 S | 10/2015 | Park et al. | |
| 9,170,674 B2 | 10/2015 | Forutanpour et al. | |

(56) References Cited

U.S. PATENT DOCUMENTS

| | | |
|---|---|---|
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 | 5/2016 | Poupyrev et al. |
| 9,351,653 B1 | 5/2016 | Harrison |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| 9,439,566 B2 | 9/2016 | Arne et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| 9,483,123 B2 | 11/2016 | Aleem et al. |
| 9,529,434 B2 | 12/2016 | Choi et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Anderson et al. |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0198472 A1 | 12/2002 | Kramer |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0010210 A1 | 1/2004 | Avinash et al. |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0080499 A1* | 4/2004 | Lui .............. G06F 3/04883 345/179 |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0149338 A1 | 7/2006 | Flaherty et al. |
| 2006/0211956 A1 | 9/2006 | Sankai |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0285399 A1 | 12/2007 | Lund |
| 2008/0001735 A1 | 1/2008 | Tran |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1* | 7/2008 | Westerman ........ G06K 9/00355 715/863 |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1* | 1/2009 | Hildreth ............... G06F 3/011 345/158 |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1* | 3/2009 | Hildreth ............. H04N 7/147 348/14.03 |
| 2009/0082692 A1 | 3/2009 | Hale et al. |
| 2009/0082701 A1 | 3/2009 | Zohar et al. |
| 2009/0102580 A1 | 4/2009 | Uchaykin |
| 2009/0112080 A1 | 4/2009 | Matthews |

(56) References Cited

U.S. PATENT DOCUMENTS

| | | |
|---|---|---|
| 2009/0124881 A1 | 5/2009 | Rytky |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0209878 A1 | 8/2009 | Sanger |
| 2009/0251407 A1 | 10/2009 | Flake et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0326406 A1 | 12/2009 | Tan et al. |
| 2009/0327171 A1* | 12/2009 | Tan ................ G06N 20/00 706/12 |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0228487 A1 | 9/2010 | Leuthardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0066381 A1 | 3/2011 | Garudadri et al. |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0007821 A1 | 1/2012 | Zaliva |
| 2012/0029322 A1 | 2/2012 | Wartena et al. |
| 2012/0051005 A1 | 3/2012 | VanFleteren et al. |
| 2012/0066163 A1 | 3/2012 | Balls et al. |
| 2012/0071780 A1 | 3/2012 | Barachant et al. |
| 2012/0101357 A1 | 4/2012 | Hoskuldsson et al. |
| 2012/0117514 A1 | 5/2012 | Kim et al. |
| 2012/0157789 A1 | 6/2012 | Kangas et al. |
| 2012/0165695 A1 | 6/2012 | Kidmose et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0265090 A1 | 10/2012 | Fink et al. |
| 2012/0265480 A1 | 10/2012 | Oshima |
| 2012/0283526 A1 | 11/2012 | Gommesen et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0217998 A1 | 8/2013 | Mahfouz et al. |
| 2013/0221996 A1 | 8/2013 | Poupyrev et al. |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0052150 A1 | 2/2014 | Taylor et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0223462 A1 | 8/2014 | Aimone et al. |
| 2014/0236031 A1 | 8/2014 | Banet et al. |
| 2014/0240103 A1 | 8/2014 | Lake et al. |
| 2014/0240223 A1* | 8/2014 | Lake .................... G08C 17/02 345/156 |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0277622 A1* | 9/2014 | Raniere ................ G05B 15/02 700/84 |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |

(56) References Cited

U.S. PATENT DOCUMENTS

| | | |
|---|---|---|
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1* | 12/2014 | Katz ................ G06F 3/011 |
| | | 345/156 |
| 2014/0364703 A1 | 12/2014 | Kim et al. |
| 2014/0365163 A1 | 12/2014 | Jallon |
| 2014/0368428 A1* | 12/2014 | Pinault ............ A63F 13/28 |
| | | 345/156 |
| 2014/0368474 A1* | 12/2014 | Kim ................ A61B 5/681 |
| | | 345/179 |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0312175 A1 | 10/2015 | Langholz |
| 2015/0313496 A1 | 11/2015 | Connor |
| 2015/0323998 A1* | 11/2015 | Kudekar ............ G06F 3/014 |
| | | 345/156 |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1* | 12/2015 | Toth ................ A61B 5/6839 |
| | | 600/373 |
| 2015/0355716 A1 | 12/2015 | Balasubramanian et al. |
| 2015/0355718 A1 | 12/2015 | Slonneger |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xioli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Imperial |
| 2016/0263458 A1 | 9/2016 | Mather et al. |
| 2016/0274732 A1* | 9/2016 | Bang ................ G06F 3/017 |
| 2016/0274758 A1 | 9/2016 | Bailey |
| 2016/0275726 A1 | 9/2016 | Mullins |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1* | 10/2016 | Walline ............ G06F 3/04812 |
| 2016/0313899 A1 | 10/2016 | Noel |
| 2016/0314623 A1 | 10/2016 | Coleman et al. |
| 2016/0342227 A1 | 11/2016 | Natzke et al. |
| 2016/0350973 A1 | 12/2016 | Shapira et al. |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068445 A1* | 3/2017 | Lee ................ G06K 9/00402 |
| 2017/0075426 A1 | 3/2017 | Camacho Perez et al. |
| 2017/0079828 A1 | 3/2017 | Pedtke et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0119472 A1 | 5/2017 | Herrmann et al. |
| 2017/0123487 A1 | 5/2017 | Hazra et al. |
| 2017/0124474 A1 | 5/2017 | Kashyap |
| 2017/0124816 A1 | 5/2017 | Yang et al. |
| 2017/0147077 A1 | 5/2017 | Park et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0209055 A1 | 7/2017 | Pantelopoulos et al. |

(56) References Cited

U.S. PATENT DOCUMENTS

| | | |
|---|---|---|
| 2017/0220923 A1 | 8/2017 | Bae et al. |
| 2017/0237789 A1 | 8/2017 | Harner et al. |
| 2017/0237901 A1 | 8/2017 | Lee et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1* | 4/2018 | Chen .................. G06F 3/015 |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1* | 10/2018 | Connor ................ G01R 27/02 |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0089898 A1 | 3/2019 | Kim et al. |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0209034 A1 | 7/2019 | Deno et al. |
| 2019/0212817 A1 | 7/2019 | Kaifosh et al. |
| 2019/0216619 A1 | 7/2019 | McDonnall et al. |
| 2019/0223748 A1 | 7/2019 | Al-natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0077955 A1 | 3/2020 | Shui et al. |
| 2020/0097081 A1 | 3/2020 | Stone et al. |
| 2020/0111260 A1 | 4/2020 | Osborn et al. |
| 2020/0142490 A1 | 5/2020 | Xiong et al. |
| 2020/0143795 A1 | 5/2020 | Park et al. |
| 2020/0163562 A1 | 5/2020 | Neaves |
| 2020/0205932 A1 | 7/2020 | Zar et al. |
| 2020/0225320 A1 | 7/2020 | Belskikh et al. |
| 2020/0245873 A1 | 8/2020 | Frank et al. |
| 2020/0275895 A1 | 9/2020 | Barachant |
| 2020/0301509 A1 | 9/2020 | Liu et al. |
| 2020/0305795 A1 | 10/2020 | Floyd et al. |
| 2020/0320335 A1 | 10/2020 | Shamun et al. |
| 2021/0109598 A1 | 4/2021 | Zhang et al. |
| 2021/0117523 A1 | 4/2021 | Kim et al. |
| 2021/0290159 A1 | 9/2021 | Bruinsma et al. |
| 2022/0256706 A1 | 8/2022 | Xiong et al. |

FOREIGN PATENT DOCUMENTS

| | | |
|---|---|---|
| CA | 2939644 A1 | 8/2015 |
| CN | 1838933 A | 9/2006 |
| CN | 103777752 A | 5/2014 |
| CN | 105009031 A | 10/2015 |
| CN | 105190477 A | 12/2015 |
| CN | 105190578 A | 12/2015 |
| CN | 106102504 A | 11/2016 |
| CN | 110300542 A | 10/2019 |
| CN | 111902077 A | 11/2020 |
| CN | 112074225 A | 12/2020 |
| CN | 112469469 A | 3/2021 |
| CN | 112822992 A | 5/2021 |
| DE | 4412278 A1 | 10/1995 |
| EP | 0301790 A2 | 2/1989 |
| EP | 1345210 A2 | 9/2003 |
| EP | 2198521 B1 | 6/2012 |
| EP | 2541763 A1 | 1/2013 |
| EP | 2959394 A1 | 12/2015 |
| EP | 3104737 A1 | 12/2016 |
| EP | 3 200 051 A1 | 8/2017 |
| EP | 3487395 A1 | 5/2019 |
| EP | 2959394 B1 | 5/2021 |
| JP | H05-277080 A | 10/1993 |
| JP | 3103427 B2 | 10/2000 |
| JP | 2002287869 A | 10/2002 |

(56) References Cited

FOREIGN PATENT DOCUMENTS

| | | |
|---|---|---|
| JP | 2005-095561 A | 4/2005 |
| JP | 2009050679 A | 3/2009 |
| JP | 2010-520561 A | 6/2010 |
| JP | 2016-507851 A | 3/2016 |
| JP | 2017-509386 A | 4/2017 |
| JP | 2019023941 A | 2/2019 |
| JP | 2021072136 A | 5/2021 |
| KR | 20120094870 A | 8/2012 |
| KR | 20120097997 A | 9/2012 |
| KR | 2015-0123254 A | 11/2015 |
| KR | 2016-0121552 A | 10/2016 |
| KR | 10-2017-0067873 A | 6/2017 |
| KR | 20170107283 A | 9/2017 |
| KR | 10-1790147 B1 | 10/2017 |
| WO | 9527341 A1 | 10/1995 |
| WO | 2006086504 A2 | 8/2006 |
| WO | WO 2008/109248 A2 | 9/2008 |
| WO | WO 2009/042313 A1 | 4/2009 |
| WO | WO 2010/104879 A2 | 9/2010 |
| WO | 2011070554 A2 | 6/2011 |
| WO | WO 2012/155157 A1 | 11/2012 |
| WO | WO 2014/130871 A1 | 8/2014 |
| WO | WO 2014/186370 A1 | 11/2014 |
| WO | WO 2014/194257 A1 | 12/2014 |
| WO | WO 2014/197443 A1 | 12/2014 |
| WO | WO 2015/027089 A1 | 2/2015 |
| WO | WO 2015/073713 A1 | 5/2015 |
| WO | WO 2015/081113 A1 | 6/2015 |
| WO | 2015100172 A1 | 7/2015 |
| WO | WO 2015/123445 A1 | 8/2015 |
| WO | 2015184760 A1 | 12/2015 |
| WO | 2015192117 A1 | 12/2015 |
| WO | WO 2015/199747 A1 | 12/2015 |
| WO | WO 2016/041088 A1 | 3/2016 |
| WO | WO 2017/062544 A1 | 4/2017 |
| WO | 2017075611 A1 | 5/2017 |
| WO | WO 2017/092225 A1 | 6/2017 |
| WO | WO 2017/120669 A1 | 7/2017 |
| WO | WO 2017/172185 A1 | 10/2017 |
| WO | WO 2017/208167 A1 | 12/2017 |
| WO | 2018022602 A1 | 2/2018 |
| WO | 2018098046 A2 | 5/2018 |
| WO | 2019099758 A1 | 5/2019 |
| WO | 2019147953 A1 | 8/2019 |
| WO | 2019147958 A1 | 8/2019 |
| WO | 2019147996 A1 | 8/2019 |
| WO | 2019217419 A2 | 11/2019 |
| WO | 2019226259 A1 | 11/2019 |
| WO | 2019231911 A1 | 12/2019 |
| WO | 2020/061451 A1 | 3/2020 |
| WO | 2020047429 A1 | 3/2020 |
| WO | 2020061440 A1 | 3/2020 |
| WO | 2020072915 A1 | 4/2020 |

OTHER PUBLICATIONS

Extended European Search Report for European Application No. EP 17835140.9 dated Nov. 26, 2019.
International Preliminary Report on Patentability for International Application No. PCT/US2017/043686 dated Feb. 7, 2019.
International Search Report and Written Opinion for International Application No. PCT/US2017/043686 dated Oct. 6, 2017.
International Preliminary Report on Patentability for International Application No. PCT/US2017/043693 dated Feb. 7, 2019.
International Search Report and Written Opinion for International Application No. PCT/US2017/043693 dated Oct. 6, 2017.
International Preliminary Report on Patentability for International Application No. PCT/US2017/043791 dated Feb. 7, 2019.
International Search Report and Written Opinion for International Application No. PCT/US2017/043791 dated Oct. 5, 2017.
International Preliminary Report on Patentability for International Application No. PCT/US2017/043792 dated Feb. 7, 2019.
International Search Report and Written Opinion for International Application No. PCT/US2017/043792 dated Oct. 5, 2017.
International Search Report and Written Opinion for International Application No. PCT/US2018/056768 dated Jan. 15, 2019.
International Search Report and Written Opinion for International Application No. PCT/US2018/061409 dated Mar. 12, 2019.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 28, 2019.
International Search Report and Written Opinion for International Application No. PCT/US2019/015244 dated May 16, 2019.
International Search Report and Written Opinion for International Application No. PCT/US2019/037302 dated Oct. 11, 2019.
International Search Report and Written Opinion for International Application No. PCT/US2019/028299 dated Aug. 9, 2019.
International Search Report and Written Opinion for International Application No. PCT/US2019/034173 dated Sep. 18, 2019.
International Search Report and Written Opinion for International Application No. PCT/US2019/042579 dated Oct. 31, 2019.
Invitation to Pay Additional Fees for International Application No. PCT/US2019/031114 dated Aug. 6, 2019.
Invitation to Pay Additional Fees for International Application No. PCT/US2019/049094 dated Oct. 24, 2019.
International Search Report and Written Opinion for International Application No. PCT/US2019/052131 dated Dec. 6, 2019.
International Search Report and Written Opinion for International Application No. PCT/US2019/046351 dated Nov. 7, 2019.
International Search Report and Written Opinion for International Application No. PCT/US19/20065 dated May 16, 2019.
Al-Mashhadany, Inverse Kinematics Problem (IKP) of 6-DOF Manipulator Bgy Locally Recurrent Neural Networks (LRNNs). Management and Service Science (MASS). 2010 International Conference ON, IEEE. Aug. 24, 2010. 5 pages. ISBN: 978-1-4244-5325-2.
Arkenbout et al., Robust Hand Motion Tracking through Data Fusion of 5DT Data Glove and Nimble VR Kinect Camera Measurements. Sensors. 2015;15:31644-71.
Benko et al., Enhancing Input On and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24:11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Davoodi et al., Development of a Physics-Based Target Shooting Game to Train Amputee Users of Multijoint Upper Limb Prostheses. Presence. Massachusetts Institute of Technology. 2012;21(1):85-95.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.

(56) References Cited

OTHER PUBLICATIONS

Ding et al., HMM with improved feature extraction-based feature parameters for identity recognition of gesture command operators by using a sensed Kinect-data stream. Neurocomputing. 2017;262:108-19.
Farina et al., Man/machine interface based on the discharge timings of spinal motor neurons after targeted muscle reinnervation. Nature. Biomedical Engineering. 2017;1:1-12.
Favorskaya et al., Localization and Recognition of Dynamic Hand Gestures Based on Hierarchy of Manifold Classifiers. International Archives of the Photogrammetry, Remote Sensing and Spatial Information Sciences. 2015;XL-5/W6:1-8.
Gallina et al., Surface EMG Biofeedback. Surface Electromyography: Physiology, Engineering, and Applications. 2016:485-500.
Gopura et al., A Human Forearm and wrist motion assist exoskeleton robot with EMG-based fuzzy-neuro control. Proceedings of the 2nd IEEE/RAS-EMBS International Conference on Biomedical Robotics and Biomechatronics. Oct. 19-22, 2008. 6 pages.
Hauschild et al., A Virtual Reality Environment for Designing and Fitting Neural Prosthetic Limbs. IEEE Transactions on Neural Systems and Rehabilitation Engineering. 2007;15(1):9-15.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kim et al., Real-Time Human Pose Estimation and Gesture Recognition from Depth Images Using Superpixels and SVM Classifier. Sensors. 2015;15:12410-27.
Kipke et al., Silicon-substrate Intracortical Microelectrode Arrays for Long-Term Recording of Neuronal Spike Activity in Cerebral Cortex. IEEE Transactions on Neural Systems and Rehabilitation Engineering. 2003;11(2):151-155.
Koerner, Design and Characterization of the Exo-Skin Haptic Device: A Novel Tendon Actuated Textile Hand Exoskeleton. 2017. 5 pages.
Lee et al., Motion and Force Estimation System of Human Fingers. Journal of Institute of Control, Robotics and Systems. 2011;17(10):1014-1020.
Li et al., Motor Function Evaluation of Hemiplegic Upper-Extremities Using Data Fusion from Wearable Inertial and Surface EMG Sensors. Sensors. MDPI. 2017;17(582):1-17.
Lopes et al., Hand/arm gesture segmentation by motion using IMU and EMG sensing. ScienceDirect. Elsevier. Procedia Manufacturing. 2017;11:107-13.
Marcard et al., Sparse Inertial Poser: Automatic 3D Human Pose Estimation from Sparse IMUs. Eurographics. 2017;36(2). 12 pages.
Martin et al., A Novel Approach of Prosthetic Arm Control using Computer Vision, Biosignals, and Motion Capture. IEEE. 2014. 5 pages.
McIntee, A Task Model of Free-Space Movement-Based Gestures. Dissertation. Graduate Faculty of North Carolina State University. Computer Science. 2016. 129 pages.
Mendes et al., Sensor Fusion and Smart Sensor in Sports and Biomedical Applications. Sensors. 2016;16(1569):1-31.
Mohamed, Homogeneous cognitive based biometrics for static authentication. Dissertation submitted to University of Victoria, Canada. 2010. 149 pages. URL:http://hdl.handle.net/1828/3211 [last accessed Oct. 11, 2019].
Naik et al., Source Separation and Identification issues in bio signals: A solution using Blind source separation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13:1-17.

Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sartori et al., Neural Data-Driven Musculoskeletal Modeling for Personalized Neurorehabilitation Technologies. IEEE Transactions on Biomedical Engineering. 2016;63(5):879-93.
Sauras-Perez, et al., A Voice and Pointing Gesture Interaction System for Supporting Human Spontaneous Decisions in Autonomous Cars. Clemson University. All Dissertations. 2017. 174 pages.
Shen et al., I am a Smartwatch and I can Track my User's Arm. University of Illinois at Urbana-Champaign. MobiSys' 16. 12 pages.
Son et al., Evaluating the utility of two gestural discomfort evaluation methods. PLoS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Valero-Cuevas et al., Computational Models for Neuromuscular Function. NIH Public Access Author Manuscript. Jun. 16, 2011. 52 pages.
Wittevrongel et al., Spatiotemporal Beamforming: A Transparent and Unified Decoding Approach to Synchronous Visual Brain-Computer Interfacing. Frontiers in Neuroscience. 2017;11:1-12.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
Yang et al., Surface EMG based handgrip force predictions using gene expression programming. Neurocomputing. 2016;207:568-579.
Zacharaki et al., Spike pattern recognition by supervised classification in low dimensional embedding space. Brain Informatics. 2016;3:73-8. DOI: 10.1007/s40708-016-0044-4.
EP 17835111.0, Nov. 21, 2019, Extended European Search Report.
EP 17835140.9, Nov. 26, 2019, Extended European Search Report.
PCT/US19/20065, Oct. 6, 2017, International Search Report and Written Opinion.
PCT/US2017/043686, Oct. 6, 2017, International Search Report and Written Opinion.
PCT/US2017/043686, Feb. 7, 2019, International Preliminary Report on Patentability.
PCT/US2017/043693, Oct. 6, 2017, International Search Report and Written Opinion.
PCT/US2017/043693, Feb. 7, 2019, International Preliminary Report on Patentability.
PCT/US2017/043971, Oct. 5, 2017, International Search Report and Written Opinion.
PCT/US2017/043791, Feb. 7, 2019, International Preliminary Report on Patentability.
PCT/US2017/043792, Oct. 5, 2017, International Search Report and Written Opinion.
PCT/US2017/043792, Feb. 7, 2019, International Preliminary Report on Patentability.
PCT/US2018/056768, Jan. 15, 2019, International Search Report and Written Opinion.
PCT/US2018/061409, Mar. 12, 2019, International Search Report and Written Opinion.
PCT/US2018/063215, Mar. 21, 2019, International Search Report and Written Opinion.
PCT/US2019/015134, May 15, 2019, International Search Report and Written Opinion.
PCT/US2019/015167, May 21, 2019, International Search Report and Written Opinion.

(56) References Cited

OTHER PUBLICATIONS

PCT/US2019/015174, May 21, 2019, International Search Report and Written Opinion.
PCT/US2019/015180, May 28, 2019, International Search Report and Written Opinion.
PCT/US2019/015183, May 3, 2019, International Search Report and Written Opinion.
PCT/US2019/015238, May 16, 2019, International Search Report and Written Opinion.
PCT/US2019/015244, May 16, 2019, International Search Report and Written Opinion.
PCT/US2019/028299, Aug. 9, 2019, International Search Report and Written Opinion.
PCT/US2019/031114, Aug. 6, 2019, Invitation to Pay Additional Fees.
PCT/US2019/034173, Sep. 18, 2019, International Search Report and Written Opinion.
PCT/US2019/037302, Oct. 11, 2019, International Search Report and Written Opinion.
PCT/US2019/042579, Oct. 31, 2019, International Search Report and Written Opinion.
PCT/US2019/046351, Nov. 7, 2019, International Search Report and Written Opinion.
PCT/US2019/049094, Oct. 24, 2019, Invitation to Pay Additional Fees.
PCT/US2019/052131, Dec. 6, 2019, International Search Report and Written Opinion.
International Search Report and Written Opinion received for PCT Application Serial No. PCT/US2019/052151 dated Jan. 15, 2020, 10 pages.
Al-Jumaily A., et al., "Electromyogram(EMG) Driven System based Virtual Reality for Prosthetic and Rehabilitation Devices," Proceedings of the 11th InternationalConference on Information Integration AndWeb-Based Applications & Services, Jan. 1, 2009, pp. 582-586.
European Search Report for European Application No. 19861903.3, dated Oct. 12, 2021, 2 pages.
International Preliminary Report on Patentability for International Application No. PCT/US2019/052151, dated Apr. 1, 2021, 9 pages.
Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Berenzweig A., et al., "Wearable Devices and Methods for Improved Speech Recognition," U.S. Appl. No. 16/785,680, filed Feb. 10, 2020, 67 pages.
Brownlee J., "Finite State Machines (FSM): Finite State Machines as a Control Technique in Artificial Intelligence (AI)," FSM, Jun. 2002, 12 pages.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Communication Pursuant to Article 94(3) for European Patent Application No. 17835112.8, dated Dec. 14, 2020, 3 Pages.
Communication Pursuant to Rule 164(1) EPC, Partial Supplementary European Search Report for European Application No. 14753949.8, dated Sep. 30, 2016, 7 pages.
Co-pending U.S. Appl. No. 15/659,072, inventors Patrick; Kaifosh et al., filed Jul. 25, 2017.
Co-pending U.S. Appl. No. 15/816,435, inventors Ning; Guo et al., filed Nov. 17, 2017.
Co-pending U.S. Appl. No. 15/882,858, inventors Siephen; Lake et al., filed Jan. 29, 2018.
Co-pending U.S. Appl. No. 15/974,430, inventors Adam; Berenzweig et al., filed May 8, 2018.
Co-pending U.S. Appl. No. 16/353,998, inventors Patrick; Kaifosh et al., filed Mar. 14, 2019.
Co-pending U.S. Appl. No. 16/557,383, inventors Adam; Berenzweig et al., filed Aug. 30, 2019.
Co-Pending U.S. Appl. No. 16/557,427, inventors Adam; Berenzweig et al., filed Aug. 30, 2019.
Co-Pending U.S. Appl. No. 15/974,430, filed May 8, 2018, 44 Pages.
Co-Pending U.S. Appl. No. 16/353,998, filed Mar. 14, 2019, 43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Corazza S., et al.," A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved an Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Costanza E., et al., "EMG as a Subtle Input Interface for Mobile Computing," Mobile HCI, LNCS 3160, 2004, pp. 126-130.
Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.
European Search Report for European Application No. 19863248.1, dated Oct. 19, 2021, 2 pages.
European Search Report for European Application No. 19868789.9, dated May 9, 2022, 9 pages.
Extended European Search Report for European Application No. 18879156.0, dated Mar. 12, 2021, 11 pages.
Extended European Search Report for European Application No. 19744404.5, dated Mar. 29, 2021, 11 pages.
Extended European Search Report for European Application No. 19799947.7, dated May 26, 2021, 10 pages.
Extended European Search Report for European Application No. 17835112.8, dated Feb. 5, 2020, 17 pages.
Extended European Search Report for European Application No. 19806723.3, dated Jul. 7, 2021, 13 pages.
Extended European Search Report for European Application No. 19850130.6, dated Sep. 1, 2021, 14 Pages.
Extended European Search Report for European Application No. 19855191.3, dated Dec. 6, 2021, 11 pages.
Extended European Search Report for European Application No. 19883839.3, dated Dec. 15, 2021, 7 pages.
Final Office Action dated Jun. 2, 2020 for U.S. Appl. No. 15/882,858, filed Jan. 29, 2018, 127 Pages.
Final Office Action dated Jun. 2, 2020 for U.S. Appl. No. 16/557,383, filed Aug. 30, 2019, 66 Pages.
Final Office Action dated Nov. 3, 2020 for U.S. Appl. No. 15/974,430, filed May 8, 2018, 27 Pages.
Final Office Action dated Feb. 4, 2020 for U.S. Appl. No. 16/577,207, filed Sep. 20, 2019, 76 Pages.
Final Office Action dated Feb. 4, 2021 for U.S. Appl. No. 15/882,858, filed Jan. 29, 2018, 42 Pages.

(56) References Cited

OTHER PUBLICATIONS

Final Office Action dated Jun. 5, 2020 for U.S. Appl. No. 16/557,427, filed Aug. 30, 2019, 95 Pages.
Final Office Action dated Oct. 8, 2020 for U.S. Appl. No. 16/557,342, filed Aug. 30, 2019, 73 Pages.
Final Office Action dated Apr. 9, 2020 for U.S. Appl. No. 15/974,454, filed May 8, 2018, 19 Pages.
Final Office Action dated Dec. 11, 2019 for U.S. Appl. No. 15/974,430, filed May 8, 2018, 30 Pages.
Final Office Action dated Jan. 13, 2021 for U.S. Appl. No. 16/577,207, filed Sep. 20, 2019, 91 Pages.
Final Office Action dated Dec. 18, 2019 for U.S. Appl. No. 16/258,279, filed Jan. 25, 2019, 45 Pages.
Final Office Action dated Feb. 19, 2021 for U.S. Appl. No. 16/258,279, filed Jan. 25, 2019, 58 Pages.
Final Office Action dated Sep. 23, 2020 for U.S. Appl. No. 15/816,435, filed Nov. 17, 2017, 70 Pages.
Final Office Action dated Jan. 28, 2020 for U.S. Appl. No. 16/557,342, filed Aug. 30, 2019, 15 Pages.
Final Office Action dated Jul. 28, 2017 for U.S. Appl. No. 14/505,836, filed Oct. 3, 2014, 52 Pages.
Final Office Action dated Jun. 28, 2021 for U.S. Appl. No. 16/557,342, filed Aug. 30, 2019, 11 Pages.
Final Office Action dated Nov. 29, 2019 for U.S. Appl. No. 15/659,072, filed Jul. 25, 2017, 36 Pages.
Final Office Action dated Nov. 29, 2019 for U.S. Appl. No. 16/353,998, filed Mar. 14, 2019, 33 Pages.
Fong H.C., et al., "PepperGram With Interactive Control," 22nd International Conference Onvirtual System & Multimedia (VSMM), Oct. 17, 2016, 5 pages.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
International Search Report and Written Opinion for International Application No. PCT/US2014/017799, dated May 16, 2014, 9 pages.
International Search Report and Written Opinion for International Application No. PCT/US2014/037863, dated Aug. 21, 2014, 10 pages.
International Preliminary Report on Patentability for International Application No. PCT/US2019/031114, dated Nov. 19, 2020, 16 pages.
International Preliminary Report on Patentability for International Application No. PCT/US2019/049094, dated Mar. 11, 2021, 24 Pages.
International Preliminary Report on Patentability for International Application No. PCT/US2014/017799, dated Sep. 3, 2015, 8 Pages.
International Preliminary Report on Patentability for International Application No. PCT/US2014/037863, dated Nov. 26, 2015, 8 pages.
International Preliminary Report on Patentability for International Application No. PCT/US2014/052143, dated Mar. 3, 2016, 7 pages.
International Preliminary Report on Patentability for International Application No. PCT/US2014/067443, dated Jun. 9, 2016, 7 pages.
International Preliminary Report on Patentability for International Application No. PCT/US2015/015675, dated Aug. 25, 2016, 8 Pages.
International Preliminary Report on Patentability for International Application No. PCT/US2018/061409, dated May 28, 2020, 10 pages.
International Preliminary Report on Patentability for International Application No. PCT/US2019/015174, dated Aug. 6, 2020, 7 pages.
International Preliminary Report on Patentability for International Application No. PCT/US2019/028299, dated Dec. 10, 2020, 11 pages.
International Preliminary Report on Patentability for International Application No. PCT/US2019/046351, dated Feb. 25, 2021, 8 pages.
International Preliminary Report on Patentability for International Application No. PCT/US2019/052131, dated Apr. 1, 2021, 8 pages.
International Preliminary Report on Patentability for International Application No. PCT/US2019/054716, dated Apr. 15, 2021, 10 pages.
International Preliminary Report on Patentability for International Application No. PCT/US2019/061759, dated May 27, 2021, 12 pages.
International Preliminary Report on Patentability for International Application No. PCT/US2020/049274, dated Mar. 17, 2022, 14 pages.
International Search Report and Written Opinion for International Application No. PCT/US2014/052143, dated Nov. 21, 2014, 8 Pages.
International Search Report and Written Opinion for International Application No. PCT/US2014/067443, dated Feb. 27, 2015, 8 pages.
International Search Report and Written Opinion for International Application No. PCT/US2015/015675, dated May 27, 2015, 9 Pages.
International Search Report and Written Opinion for International Application No. PCT/US2019/031114, dated Dec. 20, 2019, 18 Pages.
International Search Report and Written Opinion for International Application No. PCT/US2019/049094, dated Jan. 9, 2020, 27 Pages.
International Search Report and Written Opinion for International Application No. PCT/US2019/054716, dated Dec. 20, 2019, 11 Pages.
International Search Report and Written Opinion for International Application No. PCT/US2019/061759, dated Jan. 29, 2020, 12 pages.
International Search Report and Written Opinion for International Application No. PCT/US2020/025735, dated Jun. 22, 2020, 10 pages.
International Search Report and Written Opinion for International Application No. PCT/US2020/025772, dated Aug. 3, 2020, 11 pages.
International Search Report and Written Opinion for International Application No. PCT/US2020/025797, dated Jul. 9, 2020, 10 pages.
International Search Report and Written Opinion for International Application No. PCT/US2020/049274, dated Feb. 1, 2021, 17 pages.
International Search Report and Written Opinion for International Application No. PCT/US2020/061392, dated Mar. 12, 2021, 12 pages.
Kainz et al., "Approach to Hand Tracking and Gesture Recognition Based on Depth-Sensing Cameras and EMG Monitoring," Acta Informatica Pragensia, vol. 3, Jan. 1, 2014, pp. 104-112, Retrieved from the Internet URL: https://aip.vse.cz/pdfs/aip/2014/01/08.pdf.
Morris D., et al., "Emerging Input Technologies for Always-Available Mobile Interaction," Foundations and Trends in Human-Computer Interaction, 2010, vol. 4 (4), pp. 245-316.
Naik G.R., et al., "Real-Time Hand Gesture Identification for Human Computer Interaction Based on ICA of Surface Electromyogram," IADIS International Conference Interfaces and Human Computer Interaction, 2007, pp. 83-90.
Non-Final Office Action dated Mar. 2, 2021 for U.S. Appl. No. 15/974,430, filed May 8, 2018, 32 Pages.
Non-Final Office Action dated Sep. 2, 2020 for U.S. Appl. No. 15/882,858, filed Jan. 29, 2018, 66 Pages.
Non-Final Office Action dated Aug. 3, 2020 for U.S. Appl. No. 16/593,446, filed Oct. 4, 2019, 44 pages.
Non-Final Office Action dated Jun. 3, 2021 for U.S. Appl. No. 15/816,435, filed Nov. 17, 2017, 32 Pages.
Non-Final Office Action dated Jun. 5, 2020 for U.S. Appl. No. 15/659,072, filed Jul. 25, 2017, 59 Pages.
Non-Final Office Action dated Feb. 8, 2021 for U.S. Appl. No. 16/557,342, filed Aug. 30, 2019, 11 Pages.

(56) References Cited

OTHER PUBLICATIONS

Non-Final Office Action dated Oct. 8, 2020 for U.S. Appl. No. 16/577,207, filed Sep. 20, 2019, 51 Pages.
Non-Final Office Action dated Aug. 11, 2021 for U.S. Appl. No. 16/577,207, filed Sep. 20, 2019, 35 Pages.
Non-Final Office Action dated Jun. 13, 2019 for U.S. Appl. No. 16/258,279, filed Jan. 25, 2019, 38 Pages.
Non-Final Office Action dated Jun. 15, 2020 for U.S. Appl. No. 16/557,342, filed Aug. 30, 2019, 46 Pages.
Non-Final Office Action dated Jan. 16, 2020 for U.S. Appl. No. 16/389,419, filed Apr. 19, 2019, 26 Pages.
Non-Final Office Action dated May 16, 2019 for U.S. Appl. No. 15/974,384, filed May 8, 2018, 13 Pages.
Non-Final Office Action dated May 16, 2019 for U.S. Appl. No. 15/974,430, filed May 8, 2018, 12 Pages.
Non-Final Office Action dated Nov. 19, 2019 for U.S. Appl. No. 16/577,207, filed Sep. 20, 2019, 32 Pages.
Non-Final Office Action dated Aug. 20, 2020 for U.S. Appl. No. 15/974,454, filed May 8, 2018, 59 Pages.
Non-Final Office Action dated Dec. 20, 2019 for U.S. Appl. No. 15/974,454, filed May 8, 2018, 41 Pages.
Non-Final Office Action dated Jan. 22, 2020 for U.S. Appl. No. 15/816,435, filed Nov. 17, 2017, 35 Pages.
Non-Final Office Action dated Oct. 22, 2019 for U.S. Appl. No. 16/557,342, filed Aug. 30, 2019, 16 Pages.
Non-Final Office Action dated Dec. 23, 2019 for U.S. Appl. No. 16/557,383, filed Aug. 30, 2019, 53 Pages.
Non-Final Office Action dated Dec. 23, 2019 for U.S. Appl. No. 16/557,427, filed Aug. 30, 2019, 52 Pages.
Non-Final Office Action dated Feb. 23, 2017 for U.S. Appl. No. 14/505,836, filed Oct. 3, 2014, 54 Pages.
Non-Final Office Action dated Jul. 23, 2020 for U.S. Appl. No. 16/593,446, filed Oct. 4, 2019, 28 pages.
Non-Final Office Action dated May 24, 2019 for U.S. Appl. No. 16/353,998, filed Mar. 14, 2019, 20 Pages.
Non-Final Office Action dated May 26, 2020 for U.S. Appl. No. 16/353,998, filed Mar. 14, 2019, 60 Pages.
Non-Final Office Action dated Nov. 27, 2020 for U.S. Appl. No. 16/258,279, filed Jan. 25, 2019, 44 Pages.
Non-Final Office Action dated Apr. 30, 2019 for U.S. Appl. No. 15/659,072, filed Jul. 25, 2017, 99 Pages.
Non-Final Office Action dated Apr. 30, 2020 for U.S. Appl. No. 15/974,430, filed May 8, 2018, 57 Pages.
Non-Final Office Action dated Dec. 30, 2019 for U.S. Appl. No. 16/593,446, filed Oct. 4, 2019, 43 pages.
Non-Final Office Action dated Jun. 30, 2016 for U.S. Appl. No. 14/505,836, filed Oct. 3, 2014, 37 Pages.
Non-Final Office Action dated Oct. 30, 2019 for U.S. Appl. No. 15/882,858, filed Jan. 29, 2018, 22 Pages.
Notice of Allowance dated Nov. 2, 2020 for U.S. Appl. No. 15/974,454, filed May 8, 2018, 24 Pages.
Notice of Allowance dated Nov. 4, 2019 for U.S. Appl. No. 15/974,384, filed May 8, 2018, 39 Pages.
Notice of Allowance dated Feb. 9, 2022 for U.S. Appl. No. 15/882,858, filed Jan. 29, 2018, 9 pages.
Notice of Allowance dated Nov. 10, 2021 for U.S. Appl. No. 15/882,858, filed Jan. 29, 2018, 6 pages.
Notice of Allowance dated Jul. 15, 2021 for U.S. Appl. No. 15/882,858, filed Jan. 29, 2018, 2 pages.
Notice of Allowance dated Dec. 16, 2020 for U.S. Appl. No. 16/593,446, filed Oct. 4, 2019, 44 pages.
Notice of Allowance dated May 18, 2020 for U.S. Appl. No. 16/258,279, filed Jan. 25, 2019, 42 Pages.
Notice of Allowance dated Aug. 19, 2020 for U.S. Appl. No. 16/557,427, filed Aug. 30, 2019, 22 Pages.
Notice of Allowance dated May 20, 2020 for U.S. Appl. No. 16/389,419, filed Apr. 19, 2019, 28 Pages.
Notice of Allowance dated Oct. 22, 2021 for U.S. Appl. No. 15/882,858, filed Jan. 29, 2018, 8 pages.
Notice of Allowance dated Aug. 23, 2021 for U.S. Appl. No. 15/974,430, filed May 8, 2018, 12 pages.
Notice of Allowance dated Dec. 23, 2020 for U.S. Appl. No. 15/659,072, filed Jul. 25, 2017, 26 Pages.
Notice of Allowance dated Jun. 28, 2021 for U.S. Appl. No. 15/882,858, filed Jan. 29, 2018, 18 pages.
Office action for European Application No. 17835112.8, dated Feb. 11, 2022, 11 Pages.
Partial Supplementary European Search Report for European Application No. 18879156.0, dated Dec. 7, 2020, 9 pages.
Picard R.W., et al., "Affective Wearables," Proceedings of the IEEE 1st International Symposium on Wearable Computers, ISWC, Cambridge, Ma, USA, Oct. 13-14, 1997, pp. 90-97.
Preinterview First Office Action dated Jun. 24, 2020 for U.S. Appl. No. 16/785,680, filed Feb. 10, 2020, 90 Pages.
Rekimoto J., "GestureWrist and GesturePad: Unobtrusive Wearable Interaction Devices," ISWC Proceedings of the 5th IEEE International Symposium on Wearable Computers, 2001, 7 pages.
Sato M., et al., "Touche: Enhancing Touch Interaction on Humans, Screens, Liquids, and Everyday Objects," CHI, Austin, Texas, May 5-10, 2012, 10 pages.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.
Ueno A., et al., "Feasibility of Capacitive Sensing of Surface Electromyographic Potential through Cloth," Sensors and Materials, 2012, vol. 24 (6), pp. 335-346.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.
European Search Report for European Application No. 19890394.0, dated Apr. 29, 2022, 9 pages.
Extended European Search Report for European Application No. 19743717.1, dated Mar. 3, 2021, 12 pages.
Extended European Search Report for European Application No. 18869441.8, dated Nov. 17, 2020, 20 pages.
Extended European Search Report for European Application No. 19810524.9, dated Mar. 17, 2021, 11 pages.
Gargiulo G., et al., "Giga-Ohm High-Impedance FET Input Amplifiers for Dry Electrode Biosensor Circuits and Systems," Integrated Microsystems: Electronics, Photonics, and Biotechnolgy, Dec. 19, 2017, 41 Pages, Retrieved from the Internet: URL: https://www.researchgate.net/profile/Aiistair_Mcewen/publication/255994293_Gigaohm_high_impedance_FETinput_amplifiers_for_dry_electrode_biosensor_circuits_and_systems.
International Preliminary Report on Patentability for International Application No. PCT/US2018/056768, dated Apr. 30, 2020, 7 pages.
International Preliminary Report on Patentability for International Application No. PCT/US2019/015183, dated Aug. 6, 2020, 7 pages.
International Preliminary Report on Patentability for International Application No. PCT/US2019/015238, dated Aug. 6, 2020, 7 pages.
International Preliminary Report on Patentability for International Application No. PCT/US2019/034173, dated Dec. 10, 2020, 9 pages.
International Preliminary Report on Patentability for International Application No. PCT/US2019/063587, dated Jun. 10, 2021, 13 pages.
International Preliminary Report on Patentability for International Application No. PCT/US2019/063587, dated Mar. 25, 2020, 16 pages.

(56) References Cited

OTHER PUBLICATIONS

Non-Final Office Action dated Sep. 6, 2019 for U.S. Appl. No. 16/424,144, filed May 28, 2019, 11 Pages.
Non-Final Office Action dated Apr. 9, 2019 for U.S. Appl. No. 16/258,409, filed Jan. 25, 2019, 71 Pages.
Non-Final Office Action dated Apr. 29, 2019 for U.S. Appl. No. 16/257,979, filed Jan. 25, 2019, 63 Pages.
Notice of Allowance dated Feb. 6, 2020 for U.S. Appl. No. 16/424,144, filed May 28, 2019, 28 Pages.
Notice of Allowance dated Jul. 19, 2019 for U.S. Appl. No. 16/258,409, filed Jan. 25, 2019, 36 Pages.
Notice of Allowance dated Jul. 31, 2019 for U.S. Appl. No. 16/257,979, filed Jan. 25, 2019, 22 Pages.
Office Action for European Patent Application No. 19743717.1, dated Apr. 11, 2022, 10 pages.
Notice of Allowance dated May 18, 2022 for U.S. Appl. No. 15/882,858, filed Jan. 29, 2018, 10 pages.

\* cited by examiner

NEUROMUSCULAR TEXT ENTRY, WRITING AND DRAWING IN AUGMENTED REALITY SYSTEMS

CROSS-REFERENCE TO RELATED APPLICATIONS

This application claims the benefit under 35 U.S.C. § 119(e) of U.S. Provisional Patent Application Ser. No. 62/734,138, filed Sep. 20, 2018, entitled "NEUROMUSCULAR TEXT ENTRY, WRITING AND DRAWING IN AUGMENTED REALITY SYSTEMS," the entire contents of which is incorporated by reference herein.

BACKGROUND

Augmented reality (AR) systems provide users with an interactive experience of a real-world environment supplemented with virtual information by overlaying computer-generated perceptual or virtual information on aspects of the real-world environment. Various techniques exist for controlling operations of an AR system. Typically, one or more input devices, such as a controller, a keyboard, a mouse, a camera, a microphone, and the like, may be used to control operations of the AR system. For example, a user may manipulate a number of buttons on an input device, such as a controller or a keyboard, to effectuate control of the AR system. In another example, a user may use voice commands to control operations of the AR system. The current techniques for controlling operations of an AR system have many flaws, so improved techniques are needed.

SUMMARY

Some embodiments are directed to coupling a system that senses neuromuscular signals via neuromuscular sensors with a system that performs extended reality (XR) functions. As will be appreciated, XR functions may include augmented reality (AR), virtual reality (VR) functions, mixed reality (MR) functions, and the like. In particular, a system that senses neuromuscular signals may be used in conjunction with an XR system to provide an improved XR experience for a user. Neuromuscular signals may be used directly as an input to an XR system (e.g., by using motor unit action potentials as an input signal) and/or the neuromuscular signals may be processed (including by using an inference model as described herein) for purpose of determining a movement, force, and/or position of a part of the user's body (e.g., the fingers, hand, and wrist). For instance, information gained within both systems may be used to improve the overall XR experience. In embodiments where a musculoskeletal representation associated with the body part is generated based on sensor data, a camera in an XR system may capture data that is used to improve the accuracy of a model of the musculoskeletal representation and/or used to calibrate the model. Further, in another implementation, muscle activation data may be visualized and displayed to a user in an XR environment. In yet another example, display information in the XR environment may be used as feedback to the user to permit the user to more accurately control their musculoskeletal input to the system. Further, control features may be provided that permit neuromuscular signals to control XR system elements including operation of the XR system itself. In addition, various forms of input (e.g., text, writing, and/or drawing) identified based on the neuromuscular signals may be provided as input to the XR system, as well as inputs to the XR system based on specific gestures.

According to aspects of the technology described herein, a computerized system for providing input to an extended reality system is provided. The system may comprise one or more neuromuscular sensors configured to detect neuromuscular signals from a user, wherein the one or more neuromuscular sensors are arranged on one or more wearable devices; and at least one computer processor. The at least one computer processor may be programmed to: determine that the computerized system is in a mode configured to provide an input to the extended reality system; identify the input based at least in part on the plurality of neuromuscular signals and/or information based on the plurality of neuromuscular signals; and provide the identified input to the extended reality system.

In an aspect, the mode is determined based on the plurality of neuromuscular signals and/or the information based on the plurality of neuromuscular signals.

In an aspect, the mode is determined based on a gesture detected from the user, wherein the gesture is identified based on the plurality of neuromuscular signals and/or the information based on the plurality of neuromuscular signals.

In an aspect, the mode is determined by receiving a selection of the mode from a user interface displayed in an extended reality environment provided by the extended reality system, wherein the user interface is configured to identify a plurality of modes from which the user may select.

In an aspect, the mode is determined based on one or more typing, writing, drawing actions, or one-handed actions detected from the user.

In as aspect, the mode is determined in response to receiving a signal from the extended reality system. In an aspect, the signal is generated by the extended reality system in response to detection of an event for which input within an extended reality environment provided by the extended reality system is desired.

In an aspect, the mode comprises a typing mode and identifying the input comprises identifying one or more tapping or typing actions based, at least in part, on the plurality of neuromuscular signals and/or the information based on the plurality of neuromuscular signals.

In an aspect, the computerized system further comprises a physical keyboard or a virtual keyboard.

In an aspect, identifying one or more tapping or typing actions comprises detecting the user tapping or typing on the physical keyboard or the virtual keyboard.

In an aspect, the mode comprises a writing mode and identifying the input comprises identifying one or more writing actions as detected from the user based, at least in part, on the plurality of neuromuscular signals and/or the information based on the plurality of neuromuscular signals.

In an aspect, the computerized system further comprises a physical stylus, physical writing implement, virtual stylus and/or virtual writing implement.

In an aspect, identifying the one or more writing actions comprises detecting the user using the physical stylus, physical writing implement, virtual stylus and/or virtual writing implement.

In an aspect, the one or more writing actions are identified as detected in mid-air.

In an aspect, the mode comprises a drawing mode and identifying the input comprises identifying one or more drawing actions as detected from the user based, at least in part, on the plurality of neuromuscular signals and/or the information based on the plurality of neuromuscular signals.

In an aspect, the one or more drawing actions detected from the user comprise a plurality of line segments and/or curves.

In an aspect, identifying the input for the drawing mode comprises identifying input as drawings and/or text.

In an aspect, the at least one computer processor is further programmed to combine drawing and text inputs such that the text overlays or annotates the drawing.

In an aspect, the mode comprises a one-handed mode and identifying the input comprise identifying one or more one-handed actions as detected from the user based, at least in part, on the plurality of neuromuscular signals and/or the information based on the plurality of neuromuscular signals.

In an aspect, the extended reality system is configured to display an indication of the identified input to the user. In an aspect, the indication of the identified input comprises text input identified based on one or more typing, writing, drawing actions, or one-handed actions detected from the user.

In an aspect, the computerized system further comprises a visual display or interface configured to present one or more suggested or predicted words or phrases for text input.

In an aspect, the computerized system further comprises a visual display or interface configured to present one or more virtual ink marks associated with one or more strokes as detected from the user.

In an aspect, the computerized system further comprises a visual display or interface configured to present a drawing as identified based on one or more drawing actions detected from the user.

In an aspect, the computerized system further comprises at least one inertial measurement unit (IMU) sensor, wherein identifying the input comprises identifying the input based, at least in part, on at least one output signal associated with the at least one IMU sensor.

In an aspect, the computerized system further comprises at least one camera, wherein identifying the input comprises identifying the input based, at least in part, on at least one output signal associated with the at least one camera.

In an aspect, the mode comprises a first mode, and the at least one computer processor is further programmed to: identify a second input based at least in part on the plurality of neuromuscular signals and/or information based on the plurality of neuromuscular signals, wherein the second input is further identified based, at least in part, on a second mode; and provide the identified second input to the extended reality system.

In an aspect, the one or more wearable devices comprises a first wearable device configured to detect neuromuscular signals from a first arm of the user and a second wearable device configured to detect neuromuscular signals from a second arm of the user.

In an aspect, the extended reality system is an augmented reality system.

According to aspects of the technology described herein, a method performed by a computerized system for providing input to an extended reality system is provided. The method comprises detecting, using one or more neuromuscular sensors arranged on one or more wearable devices, a plurality of neuromuscular signals from a user; determining that the computerized system is in a mode configured to provide input to the extended reality system; identifying the input based at least in part on the plurality of neuromuscular signals and/or information based on the plurality of neuromuscular signals; and providing the identified input to the extended reality system.

According to aspects of the technology described herein, a system for providing one or more inputs to an extended reality (XR) system. The system comprises one or more neuromuscular sensors configured to detect neuromuscular signals from a user, wherein the one or more neuromuscular sensors are arranged on one or more wearable devices; one or more auxiliary sensors configured to detect information regarding a physiological state and/or behavior from the user; and at least one computer processor. The at least one computer processor is programmed to: determine that the system is in a mode configured to provide one or more inputs to the XR system, associate the neuromuscular signals with the information detected from the one or more auxiliary sensors, process the neuromuscular signals and/or the information detected from the one or more auxiliary sensors using one or more inference models; identify the one or more inputs based on the processed neuromuscular signals and/or the processed information detected from the one or more auxiliary sensors; and provide the identified one or more inputs to the XR system.

According to aspects of the technology described herein, a kit for use with an extended reality (XR) system is provided. The kit comprises one or more neuromuscular sensors configured to detect neuromuscular signals from a user, wherein the one or more neuromuscular sensors are arranged on one or more wearable devices; one or more auxiliary sensors configured to detect information regarding a physiological state and/or behavior from the user; and at least one storage medium storing instructions. The instructions, when executed by at least one computer processor, cause the at least one computer processor to: process the neuromuscular signals from the neuromuscular sensors, process the information detected from the one or more auxiliary sensors, identify one or more user inputs based on the processed neuromuscular signals and/or the processed information detected from the one or more auxiliary sensors, and communicate the identified one or more user inputs to the XR system.

According to aspects of the technology described herein, a computerized system for providing input to an augmented reality system based, at least in part, on neuromuscular signals is provided. The system comprises a plurality of neuromuscular sensors configured to record a plurality of neuromuscular signals from a user, wherein the plurality of neuromuscular sensors are arranged on one or more wearable devices; and at least one computer processor. The at least one computer processor is programmed to: determine that the computerized system is in a mode configured to provide input including text to the augmented reality system; identify, based at least in part, on the plurality of neuromuscular signals and/or information based on the plurality of neuromuscular signals, the input, wherein the input is further identified based, at least in part, on the mode; and provide the identified input to the augmented reality system.

In an aspect, the mode comprises a typing mode and identifying the input comprises identifying one or more tapping or typing actions based, at least in part, on the plurality of neuromuscular signals and/or the information based on the plurality of neuromuscular signals; and identifying text input for the typing mode based on the one or more tapping or typing actions.

In an aspect, identifying the one or more tapping or typing actions comprises identifying the one or more tapping or typing actions on a surface of a physical keyboard.

In an aspect, identifying the one or more tapping or typing actions comprises identifying the one or more tapping or typing actions on a surface that has a virtual keyboard projected thereon by the augmented reality system.

In an aspect, the mode comprises a writing mode and identifying the input comprises identifying one or more writing actions performed by the user based, at least in part, on the plurality of neuromuscular signals and/or the information based on the plurality of neuromuscular signals; and identifying text input for the writing mode based on the one or more writing actions.

In an aspect, identifying the one or more writing actions performed by the user comprises identifying the one or more writing actions performed on a surface with a physical stylus, a physical writing implement, or fingertip or fingertips of the user.

In an aspect, identifying the one or more writing actions performed by the user comprises identifying the one or more writing actions performed on a surface with a virtual stylus or virtual writing implement.

In an aspect, identifying the one or more writing actions performed by the user comprises identifying the one or more writing actions performed in mid-air.

In an aspect, the mode comprises a drawing mode and identifying the input comprises identifying one or more drawing actions performed by the user based, at least in part, on the plurality of neuromuscular signals and/or the information based on the plurality of neuromuscular signals; and identifying the input for the drawing mode based on the one or more drawing actions.

In an aspect, the input for the drawing mode comprises a plurality of line segments and/or curves.

In an aspect, the input for the drawing mode comprises input determined based on a sequence of pixel positions controlled by the one or more drawing actions performed by the user.

In an aspect, identifying the input for the drawing mode comprises identifying a drawing based on the one or more drawing actions performed by the user; and identifying the text based on the one or more drawing actions performed by the user.

In an aspect, the at least one computer processor is further programmed to combine the drawing and the text such that the text overlays or annotates the drawing.

In an aspect, identifying the input for the drawing mode comprises identifying a drawing based on the one or more drawing actions performed by the user; and identifying the text from the drawing.

In an aspect, the mode comprises a one-handed mode and identifying the input comprises identifying one or more one-handed actions performed by the user based, at least in part, on the plurality of neuromuscular signals and/or the information based on the plurality of neuromuscular signals; and identifying the input for the one-handed mode based on the one or more one-handed actions.

In an aspect, determining that the computerized system is in the mode configured to provide the input comprises receiving a user selection of the mode.

In an aspect, receiving the user selection of the mode comprises receiving the user selection from a user interface displayed in an augmented reality environment provided by the augmented reality system, wherein the user interface is configured to identify a plurality of modes from which the user may select.

In an aspect, determining that the computerized system is in the mode configured to provide the input comprises determining the mode from the plurality of neuromuscular signals and/or the information based on the plurality of neuromuscular signals.

In an aspect determining the mode comprises identifying at least one gesture performed by the user based on the plurality of neuromuscular signals and/or the information based on the plurality of neuromuscular signals; and determining the mode corresponding to the at least one gesture.

In an aspect, determining the mode comprises determining the mode based on one or more typing, writing, drawing actions, or one-handed actions performed by the user.

In an aspect, determining that the computerized system is in the mode configured to provide the input comprises determining the mode in response to receiving a signal from the augmented reality system. In an aspect, the signal is generated at the augmented reality system in response to detection of an event for which input within an augmented reality environment provided by the augmented reality system is desired.

In an aspect, the augmented reality system is configured to display an indication of the identified input to the user.

In an aspect, the indication of the identified input comprises text input identified based on one or more typing, writing, drawing actions, or one-handed actions performed by the user.

In an aspect, the indication of the identified input comprises a listing of one or more suggested or predicted words or phrases for the text input.

In an aspect, the indication of the identified input comprises one or more virtual ink marks associated with one or more strokes made by a writing implement.

In an aspect, the indication of the identified input comprises a drawing identified based on one or more drawing actions performed by the user.

In an aspect, the indication is displayed via a user interface presented within an augmented reality environment provided by the augmented reality system.

In an aspect, the indication is rendered onto a surface that the user is interacting with by the augmented reality system.

In an aspect, the computerized system further comprises at least one inertial measurement unit (IMU) sensor, wherein identifying the text input comprises identifying the text input based, at least in part, on at least one output signal associated with the at least one IMU sensor.

In an aspect, the computerized system further comprises at least one camera, wherein identifying the text input comprises identifying the text input based, at least in part, on at least one output signal associated with the at least one camera.

In an aspect, the mode comprises a first mode, and wherein the at least one computer processor is further programmed to: identify, based at least in part, on the plurality of neuromuscular signals and/or information based on the plurality of neuromuscular signals, a second input, wherein the second input is further identified based, at least in part, on a second mode; and provide the identified second input to the augmented reality system.

In an aspect, the identified input provided to the augmented reality system comprises input identified from a plurality of sources, wherein the plurality of sources include the plurality of neuromuscular signals and at least one source other than the plurality of neuromuscular signals.

According to aspects of the technology described herein, a method performed by a computerized system for providing input to an augmented reality system based, at least in part, on neuromuscular signals is provided. The method comprises recording, using a plurality of neuromuscular sensors arranged on one or more wearable devices, a plurality neuromuscular signals from a user; determining that the computerized system is in a mode configured to provide input including text to the augmented reality system; identifying based, at least in part, on the plurality of neuromuscular signals and/or information based on the plurality of neuromuscular signals, the input, wherein the input is further identified based, at least in part, on the mode; and providing the identified input to the augmented reality system.

According to aspects of the technology described herein, a computerized system for providing input to an augmented reality system is provided. The computerized system comprises one or more neuromuscular sensors configured to detect neuromuscular signals from a user, wherein the one or more neuromuscular sensors are arranged on one or more wearable devices; and at least one computer processor. The at least one computer processor is programmed to: determine that the computerized system is in a mode configured to provide input including text to the augmented reality system, wherein the mode is determined based on the neuromuscular signals and/or information based on the neuromuscular signals, and the mode is selected from the group consisting of a typing mode, a writing mode, a drawing mode, and a one-handed mode; identify, based at least in part, on the neuromuscular signals and/or information based on the neuromuscular signals, the input, wherein the input is further identified based, at least in part, on the mode; and provide the identified input to the augmented reality system.

In an aspect, the mode is determined based on a gesture as detected from the user based on the neuromuscular signals and/or information based on the neuromuscular signals.

In an aspect, the mode comprises a typing mode and identifying the input comprises identifying one or more tapping or typing actions based, at least in part, on the neuromuscular signals and/or the information based on the neuromuscular signals; and identifying text input for the typing mode based on the one or more tapping or typing actions.

In an aspect, identifying the one or more tapping or typing actions comprises identifying the one or more tapping or typing actions on a surface of a physical keyboard or a surface that has a representation of a keyboard projected thereon.

In an aspect, the mode comprises a writing mode and identifying the input comprises identifying one or more writing actions detected from the user based, at least in part, on the neuromuscular signals and/or the information based on the neuromuscular signals; and identifying text input for the writing mode based on the one or more writing actions.

In an aspect, identifying the one or more writing actions detected from the user comprises identifying the one or more writing actions performed on a surface with a physical stylus, physical writing implement, virtual stylus, or virtual writing implement.

In an aspect, identifying the one or more writing actions detected from the user comprises identifying the one or more writing actions as detected in mid-air.

In an aspect, the mode comprises a drawing mode and identifying the input comprises identifying one or more drawing actions detected from the user based, at least in part, on the neuromuscular signals and/or the information based on the neuromuscular signals; and identifying the input for the drawing mode based on the one or more drawing actions.

In an aspect, the one or more drawing actions comprises a plurality of line segments and/or curves.

In an aspect, identifying the input for the drawing mode comprises identifying a drawing based on the one or more drawing actions detected from the user; and identifying the text based on the one or more drawing actions detected from the user.

In an aspect, the at least one computer processor is further programmed to combine the drawing and the text such that the text overlays or annotates the drawing.

In an aspect, identifying the input for the drawing mode comprises identifying a drawing based on the one or more drawing actions detected from the user; and identifying the text from the drawing.

In an aspect, the mode comprises a one-handed mode and identifying the input comprises identifying one or more one-handed actions detected from the user based, at least in part, on the neuromuscular signals and/or the information based on the neuromuscular signals; and identifying the input for the one-handed mode based on the one or more one-handed actions.

In an aspect, the augmented reality system is configured to display an indication of the identified input to the user.

In an aspect, the indication of the identified input comprises text input identified based on one or more typing, writing, drawing actions, or one-handed actions detected from the user.

In an aspect, the indication of the identified input comprises one or more suggested or predicted words or phrases for the text input.

In an aspect, the indication of the identified input comprises one or more virtual ink marks associated with one or more strokes detected from the user.

In an aspect, the indication of the identified input comprises a drawing identified based on one or more drawing actions detected from the user.

In an aspect, the indication is displayed via a user interface presented within an augmented reality environment provided by the augmented reality system.

In an aspect, the indication is rendered onto a surface that the user is interacting with by the augmented reality system.

In an aspect, the computerized system further comprises at least one inertial measurement unit (IMU) sensor, wherein identifying the text input comprises identifying the text input based, at least in part, on at least one output signal associated with the at least one IMU sensor.

In an aspect, the computerized system further comprises at least one camera, wherein identifying the text input comprises identifying the text input based, at least in part, on at least one output signal associated with the at least one camera.

In an aspect, the mode comprises a first mode, and wherein the at least one computer processor is further programmed to: identify, based at least in part, on the neuromuscular signals and/or information based on the neuromuscular signals, a second input, wherein the second input is further identified based, at least in part, on a second mode; determine that the computerized system is to be switched from the first mode to the second mode; switch the computerized system from the first mode to the second mode in response to determining that the computerized system is to be switched from the first mode to the second mode; and provide the identified second input to the augmented reality system.

In an aspect, the identified input provided to the augmented reality system comprises input identified from a plurality of sources, wherein the plurality of sources include the neuromuscular signals and at least one source other than the neuromuscular signals.

In an aspect, the at least one source other than the neuromuscular signals comprises at least one physical input device, and the identified input provided to the augmented reality system comprises a combination of the input identified from the plurality of sources.

In an aspect, the one or more wearable devices comprises a first wearable device configured to detect neuromuscular signals from a first arm of the user and a second wearable device configured to detect neuromuscular signals from a second arm of the user.

According to aspects of the technology described herein, a method performed by a computerized system for providing input to an augmented reality system is provided. The method comprises detecting, using one or more neuromuscular sensors arranged on one or more wearable devices, neuromuscular signals from a user; determining that the computerized system is in a mode configured to provide input including text to the augmented reality system, wherein the mode is determined based on the neuromuscular signals and/or information based on the neuromuscular signals, and the mode is selected from the group consisting of a typing mode, a writing mode, a drawing mode, and a one-handed mode; identifying based, at least in part, on the neuromuscular signals and/or information based on the neuromuscular signals, the input, wherein the input is further identified based, at least in part, on the mode; and providing the identified input to the augmented reality system.

In an aspect, the mode is determined based on a gesture detected from the user, wherein the gesture is detected based on the neuromuscular signals and/or information based on the neuromuscular signals.

According to aspects of the technology described herein, a non-transitory computer-readable medium encoded with instructions that, when executed by at least one computer processor performs a method of: detecting, using a plurality of neuromuscular sensors arranged on one or more wearable devices, neuromuscular signals from a user; determining that a computerized system is in a mode configured to provide input including text to the augmented reality system, wherein the mode is determined based on the neuromuscular signals and/or information based on the neuromuscular signals, and the mode is selected from the group consisting of a typing mode, a writing mode, a drawing mode, and a one-handed mode; identifying based, at least in part, on the neuromuscular signals and/or information based on the neuromuscular signals, the input, wherein the input is further identified based, at least in part, on the mode; and providing the identified input to the augmented reality system.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIG. 8A illustrates a wearable portion of the computer-based system and FIG. 8B illustrates a dongle portion connected to a computer, wherein the dongle portion is configured to communicate with the wearable portion.

DETAILED DESCRIPTION

Figure 1:
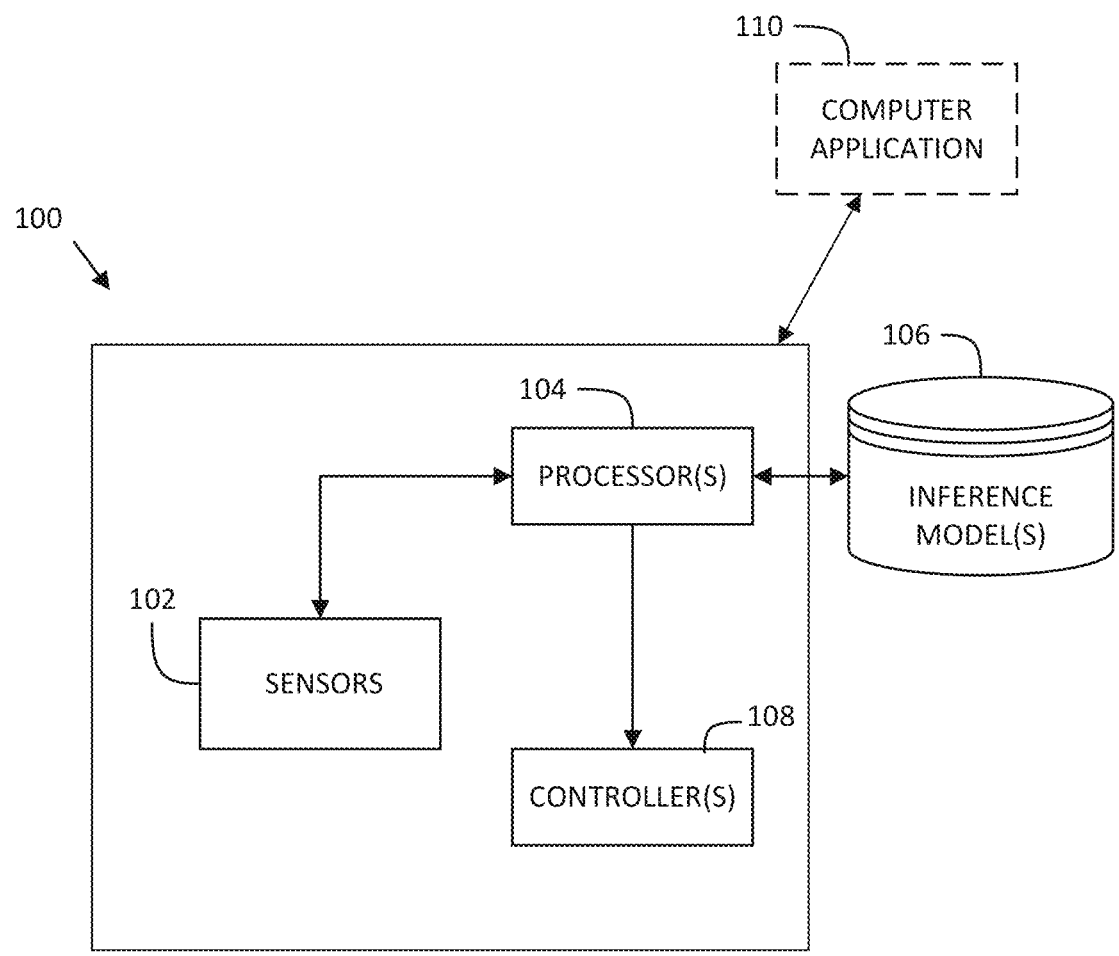
FIG. 1 is a schematic diagram of a computer-based system for processing neuromuscular sensor data in accordance with some embodiments of the technology described herein.

The inventors have developed novel techniques for providing input to extended reality (XR) systems, which include inter alia augmented reality (AR), virtual reality (VR), and mixed reality (MR) systems. Various embodiments described herein offer certain advantages, including, but not limited to, avoiding the use of an undesirable or burdensome physical keyboard, joystick, or other controller; overcoming issues associated with time consuming and high latency processing of low quality images of the user captured by a camera; allowing for the capture and detection of subtle, small, or fast movements and/or variations in force exerted by a user (e.g., varying amounts of force exerted through a stylus, writing instrument, or finger being pressed against a surface) that can be important for resolving text input and other control signals; collecting and analyzing various physiological and/or behavioral information detected from the user that enhances the identification process and is not readily obtained by conventional input devices; allowing instances where the user's hand is obscured or outside the camera's field of view, e.g., in the user's pocket, or while the user is wearing a glove; and allowing better user operability and navigability within the XR environment.

Other embodiments account for scenarios in which an individual either does not have access to input devices or may otherwise want to provide input to the XR system without the use of input devices. For example, an individual may want to provide input to the XR system in a covert manner without being noticed by other individuals.

In accordance with some embodiments, signals recorded or detected from wearable sensors are used to identify and provide input to an XR system. Various forms of input, for example, discrete control signals, continuous (e.g., 2D) control signals, text entry via a keyboard or other mode of text entry, writing, and/or drawing, may be identified from the recorded or detected signals and/or information based on the recorded or detected signals to enable improved techniques for providing input (such as text) to the XR system. In some embodiments, various forms of input may be identified based on a mode of the system that senses signals via the wearable sensors and provides input to the XR system. The user can manually, or the system can automatically, switch between input modes based, at least in part, on neuromuscular data detected from the user. In one embodiment, the system can enter a typing mode and can identify text from the user to be provided to the XR system based on one or more tapping or typing actions performed by the user (e.g., tapping on a surface of a physical keyboard, tapping on a surface that has a virtual keyboard projected thereon by the XR system, tapping on a surface that does not have a keyboard projected on it, or performing gestures in mid-air that correspond to typing-style movements). The systems and methods described herein can identify text input from the user based on the recorded or detected signals and/or information based on the recorded or detected signals. In another embodiment, the system can enter a writing mode and text input can be provided to the XR system by identifying one or more writing actions performed by the user (e.g., writing on a surface with a physical or virtual writing implement) based on the recorded or detected signals and/or information based on the recorded or detected signals. In yet another embodiment, the system can enter a drawing mode and input can be provided to the XR system by identifying one or more drawing actions (e.g., drawing one or more line segments and/or curves on a surface) performed by the user based on the recorded or detected signals and/or information based on the recorded or detected signals. In another embodiment, the system can enter a one-handed mode (i.e., a mode where the user uses only one hand to provide input), and input can be provided to the XR system by identifying one or more one-handed actions (for example, gestures such as squeezing, pinching, and/or tapping of various fingers and combinations of fingers) performed by the user based on the recorded or detected signals and/or information based on the recorded or detected signals.

In some embodiments, the XR system may provide visual feedback by displaying an indication of the identified input to the user, which may facilitate text entry or other information provided as input to the XR system. The indication can be displayed via a user interface presented within an XR environment provided by the XR system. For example, a display associated with the XR system can overlay a visual representation of the identified input in the user interface or provide audio feedback to the user about the identified input. In some embodiments, the indication may be rendered by the AR system onto a surface with which the user is interacting.

In some embodiments, the system described herein senses signals via the wearable sensors and provides input to the XR system such that the system smoothly transitions from a first input mode to a second input mode without requiring an explicit mode switch instruction from the user. This provides for a flexible approach to providing input to the XR system. For example, the system described herein may be operating in a typing mode where the user is providing text input to the system by typing on a physical keyboard. The user may stop typing on the physical keyboard and resume providing text input by writing with a stylus. In response, the system may automatically detect the change in input mode and seamlessly switch from the typing mode to a writing mode. In some embodiments, the user may switch to different forms of text entry while the system is in the same mode. For example, the user may begin by typing on a physical keyboard, and resume text entry by typing on a virtual keyboard or using typing motions without any virtual representation of a keyboard. In this scenario, the manner in which the user is providing text input has changed even though the system remains in the typing mode. In some embodiments, the visual feedback provided by the XR system may continue uninterrupted regardless of the mode or the form of text entry.

According to some embodiments, the input to be provided to the XR system may be identified, at least in part, from raw (e.g., unprocessed) sensor signals collected by one or more of the wearable sensors. In some embodiments, the input to be provided to the XR system may be identified, at least in part, from information based on the raw sensor signals (e.g., processed sensor signals), where the raw sensor signals collected by one or more of the wearable sensors are processed to perform amplification, filtering, rectification, and/or other form of signal processing, examples of which are described in more detail below. In some embodiments, the input to be provided to the XR system may be identified, at least in part, from an output of one or more trained inference models that receive the sensor signals (or processed versions of the sensor signals) as input.

As described herein, in some embodiments, various muscular activation states may be identified directly from recorded or detected sensor data. In other embodiments, handstates, gestures, postures, and the like (collectively or individually referred to as muscular activation states) may be identified based, at least in part, on the output of a trained inference model. In some embodiments, various forms of input can be provided to the AR system and may be identified directly from recorded sensor data. In other embodiments, the input can be provided to the AR system and may be identified based, at least in part, on the output of one or more trained inference models. In some embodiments, a trained inference model may output motor unit or muscle activations and/or position, orientation, and/or force estimates for segments of a computer-generated musculoskeletal model. In one example, all or portions of a human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. In this example, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies. It will be appreciated that physical models other than the multi-segment articulated rigid body system may be used to model portions of the human musculoskeletal system without departing from the scope of this disclosure.

Continuing with the example above, in kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained inference model, as described in more detail below.

In one non-limiting example, the portion of the human body approximated by a musculoskeletal representation is a hand or a combination of a hand with one or more arm segments. The information used to describe a current state of the positional relationships between segments, force relationships for individual segments or combinations of segments, and muscle and motor unit activation relationships between segments, in the musculoskeletal representation is referred to herein as the "handstate" of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position and/or orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

FIG. 1 illustrates an exemplary system 100, which comprises a neuromuscular activity system, in accordance with some embodiments. The system includes one or more sensors 102 (e.g., neuromuscular sensors) configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and/or muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the neuromuscular sensor(s) may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time. In some embodiments, the neuromuscular sensor(s) may be used to sense muscular activity related to movement caused by external objects, for example, movement of a hand being pushed by an external object.

As the tension of a muscle increases during performance of a motor task, the firing rates of active neurons increases and additional neurons may become active, which is a process referred to as motor unit recruitment. The pattern by which neurons become active and increase their firing rate is stereotyped, such that the expected motor unit recruitment patterns define an activity manifold associated with standard or normal movement. Some embodiments record activation of a single motor unit or a group of motor units that are "off-manifold," in that the pattern of motor unit activation is different than an expected or typical motor unit recruitment pattern. Such off-manifold activation is referred to herein as, "sub-muscular activation" or "activation of a sub-muscular structure," where a sub-muscular structure refers to the single motor unit or the group of motor units associated with the off-manifold activation. Examples of off-manifold motor unit recruitment patterns include, but are not limited to, selectively activating a high-threshold motor unit without activating a lower-threshold motor unit that would normally be activated earlier in the recruitment order and modulating the firing rate of a motor unit across a substantial range without modulating the activity of other neurons that would normally be co-modulated in typical motor recruitment patterns. In some embodiments, the neuromuscular sensor(s) may be used to sense sub-muscular activation(s) without observable movement. Sub-muscular activation(s) may be used, at least in part, to identify and provide input to an augmented reality system in accordance with some embodiments of the technology described herein.

In some embodiments, sensors or sensing components 102 include one or more neuromuscular sensors (e.g., EMG sensors). In other embodiments, sensors 102 include one or more auxiliary sensors such as Inertial Measurement Units (IMUs), which measure a combination of physical aspects of motion, using, for example, an accelerometer, a gyroscope, a magnetometer, or any combination of one or more accelerometers, gyroscopes and magnetometers, or any other components or devices capable of detecting spatiotemporal positioning, motion, force, or other aspects of a user's physiological state and/or behavior. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time. In other embodiments, sensors 102 include a plurality of neuromuscular sensors and at least one auxiliary sensor configured to continuously record a plurality of auxiliary signals. Examples of other auxiliary sensors include, but are not limited to, microphones, imaging devices (e.g., a camera), radiation-based sensors for use with a radiation-generation device (e.g., a laser-scanning device), or other types of sensors such as thermal sensors, infrared sensors, heart-rate or blood pressure monitors, and/or video eye trackers.

In embodiments that include at least one IMU and one or more neuromuscular sensors, the IMU(s) and neuromuscular sensors may be arranged to detect movement of the same or different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that the sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration or sub-muscular information associated with activation of sub-muscular structures in muscles of the wrist or hand.

Each of the sensors 102 includes one or more sensing components configured to sense information about a user. In the case of IMUs, the sensing components may include one or more accelerometers, gyroscopes, magnetometers, or any combination thereof to measure characteristics of body motion and/or characteristics related to body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors), vibration sensors configured to measure skin surface vibrations (e.g., for MMG sensors), and acoustic sensing components configured to measure ultrasound signals (e.g., for SMG sensors) arising from muscle activity.

In some embodiments, at least some of the plurality of sensors 102 are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the sensors may be arranged on a wearable patch configured to be affixed to a portion of the user's body. In some embodiments, multiple wearable devices, each having one or more IMUs and/or neuromuscular sensors included thereon may be used to detect neuromuscular data and generate control information based on activation of muscular and sub-muscular structures and/or movement(s) that involve(s) multiple parts of the body.

Figure 5:
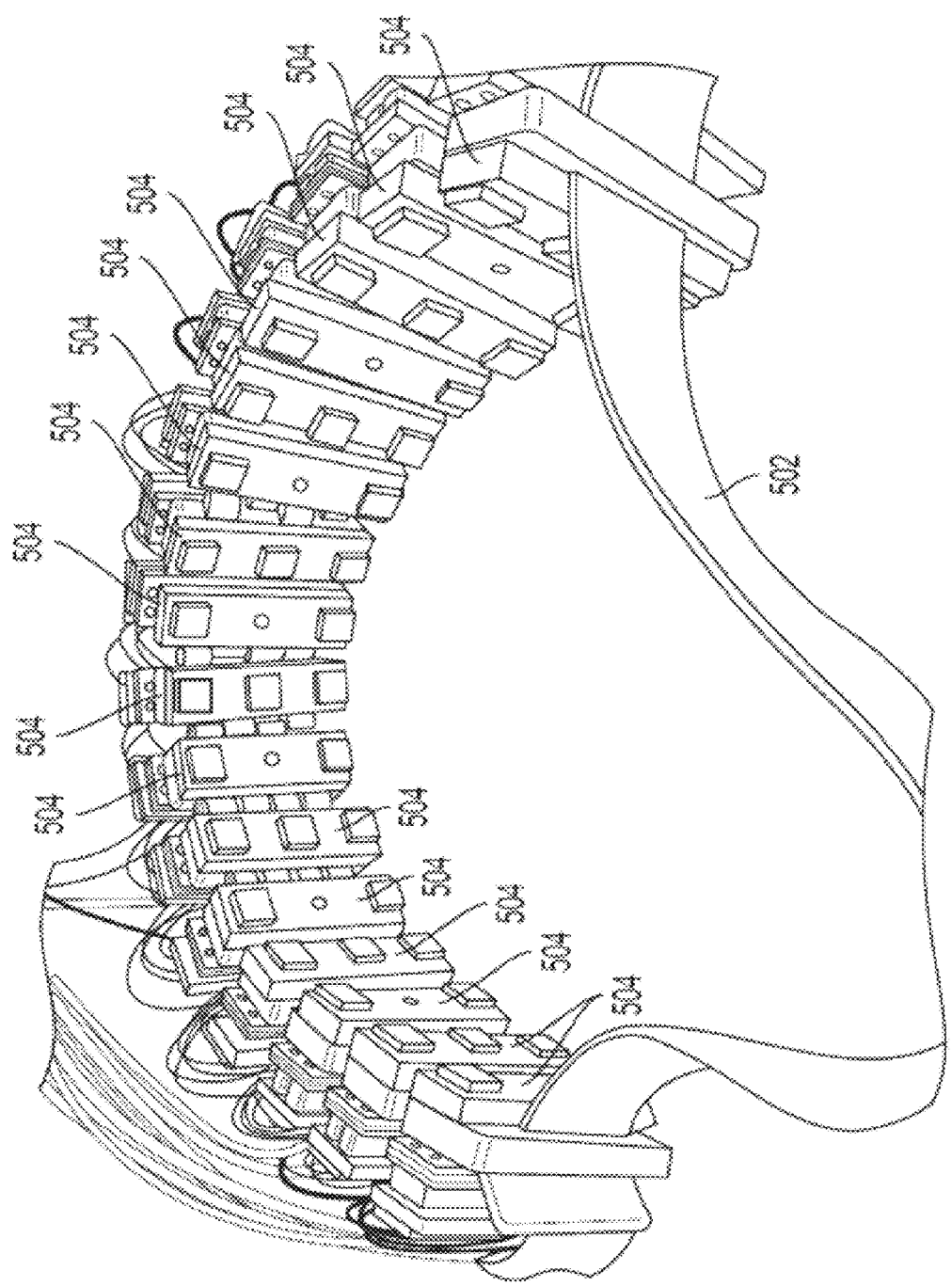
FIG. 5 illustrates a wristband having EMG sensors arranged circumferentially thereon, in accordance with some embodiments of the technology described herein.
Figure 6:
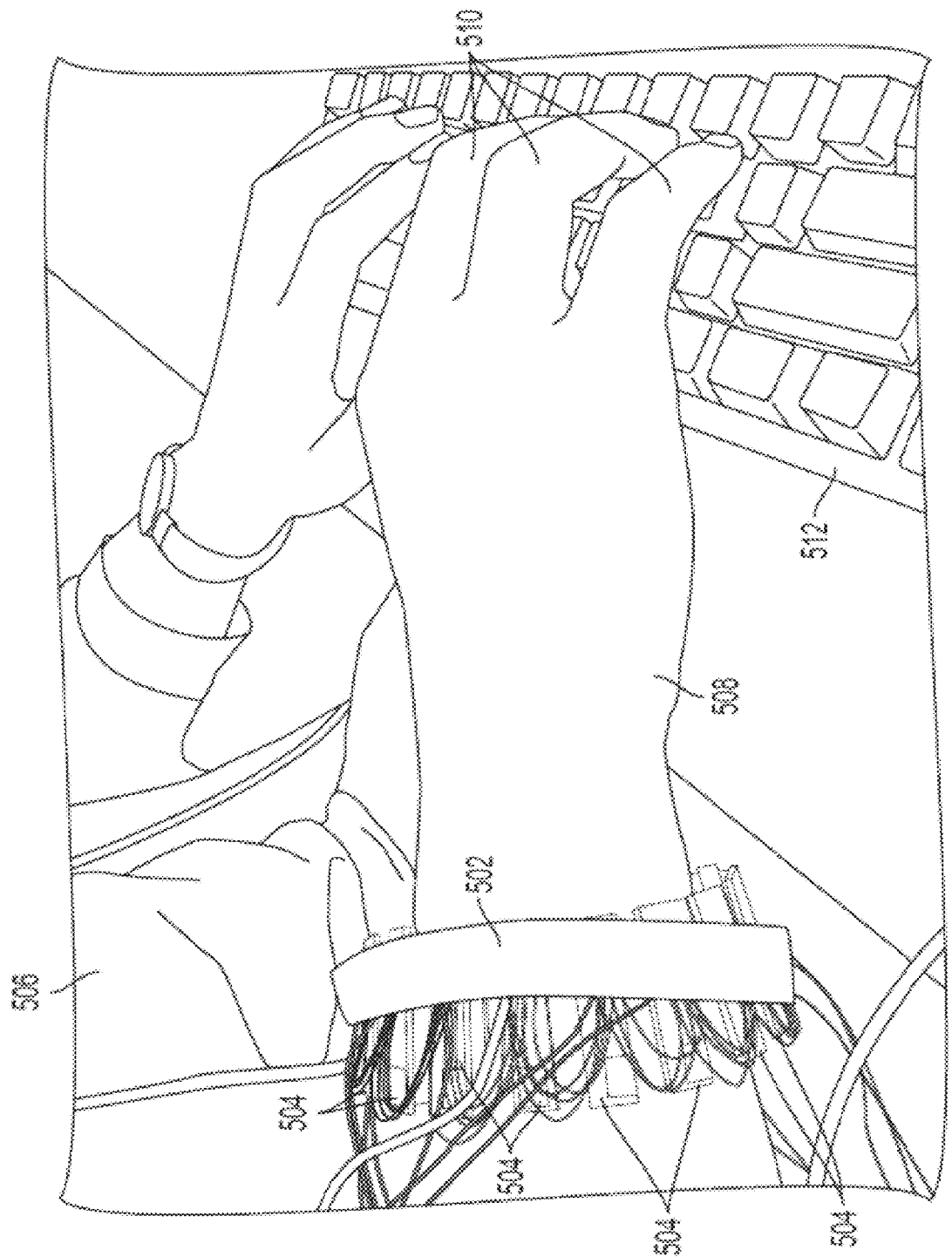
FIG. 6 illustrates a user wearing the wristband of FIG. 5 while typing on a keyboard in accordance with some embodiments of the technology described herein.

In one embodiment, sixteen EMG sensors are arranged circumferentially around an elastic band configured to be worn around a user's lower arm. For example, FIG. 5 shows EMG sensors 504 arranged circumferentially around elastic band 502. It should be appreciated that any suitable number of neuromuscular sensors may be used and the number and arrangement of neuromuscular sensors used may depend on the particular application for which the wearable device is used. For example, a wearable armband or wristband may be used to detect neuromuscular data and generate control information for controlling an augmented reality system, a robot, controlling a vehicle, scrolling through text, controlling a virtual avatar, or any other suitable control task. For example, as shown in FIG. 6, a user 506 can wear elastic band 502 on hand 508. In this way, EMG sensors 504 may be configured to record EMG signals as a user controls keyboard 512 using fingers 510. In some embodiments, elastic band 502 may also include one or more IMUs (not shown), configured to record movement information, as discussed above. Although FIG. 5 depicts the user wearing one wearable device on the hand, it will be appreciated that some embodiments include multiple wearable devices (having one or more neuromuscular sensors integrated therewith) configured to be worn on one or both hands/arms of the user.

In some embodiments, the output of one or more of the sensing components may be optionally processed using hardware signal processing circuitry (e.g., to perform amplification, filtering, and/or rectification). In other embodiments, at least some signal processing of the output of the sensing components may be performed in software. Thus, signal processing of signals recorded by the sensors may be performed in hardware, software, or by any suitable combination of hardware and software, as aspects of the technology described herein are not limited in this respect.

In some embodiments, the sensor data recorded by the sensors 102 may be optionally processed to compute additional derived measurements that are then provided as input to one or more inference models, as described in more detail below. For example, recorded signals from an IMU sensor may be processed to derive an orientation signal that specifies the orientation of a rigid body segment over time. Sensors 102 may implement signal processing using integrated components, or at least a portion of the signal processing may be performed by one or more components in communication with, but not directly integrated with the sensors.

System 100 can also include one or more computer processors 104 programmed to communicate with sensors 102 through either a one-way or two-way communication pathway. For example, signals recorded by one or more of the sensors may be provided to the processor(s), which may be programmed to execute one or more machine learning algorithms that process signals output by the sensors 102 to train (or retrain) one or more inference models 106, and the resulting trained (or retrained) inference model(s) 106 may be stored for later use in identifying and providing input to an XR system, as described in more detail below. As will be appreciated, an inference model may be a model that utilizes a statistical inference based on a probability distribution to deduce a result; in this regard, an inference model may comprise a statistical model.

In some embodiments, signals recorded by sensors arranged on a first wearable device worn on one hand/arm and signals recorded by sensors arranged on a second wearable device worn on the other hand/arm may be processed using the same inference model(s) or separate inference model(s).

System 100 also optionally includes one or more controllers 108. For example, controller 108 may be a display controller configured to display a visual representation (e.g., a representation of a hand). As discussed in more detail herein, one or more computer processors may implement one or more trained inference models that receive as input signals recorded by sensors 102 and provide as output information (e.g., predicted handstate information) that may be used to identify and provide input to an XR system. In some embodiments, as a user performs different movements, a trained inference model interprets neuromuscular signals recorded by wearable neuromuscular sensors into position and force estimates (e.g., handstate information) that are used to update the musculoskeletal representation. Because the neuromuscular signals are continuously sensed and recorded, the musculoskeletal representation is updated in real time and a visual representation of a hand (e.g., within an XR environment) may be rendered based on the current handstate estimates. As will be appreciated, an estimate of a user's handstate may be used to determine a gesture being performed by the user and/or to predict a gesture that the user will perform.

According to some embodiments, musculoskeletal representations (e.g., hand-rendering) may include actual visual representations of biomimetic (realistic) hands, synthetic (robotic) hands, as well as abstract "internal representations" that serve as input for gesture control (e.g., to other applications, systems, etc.). That is, the position and/or force of the hand may be provided to downstream algorithms (e.g., control algorithms in an XR system) but may not be directly rendered.

In some embodiments, as shown in FIG. 1, the system 100 optionally includes a computer application 110 that is configured to simulate a virtual reality (VR), augmented reality (AR), and/or a mixed reality (MR) environment (collectively, extended reality, "X Reality" or "XR" systems or environments), and the computer application 110 can display a visual character such as an avatar (e.g., via controller 108) in an XR environment. Positioning, movement, and/or forces applied by portions of the visual character within the virtual reality environment may be displayed in the XR environment based on the output of the trained inference model(s). The visual representation in the XR environment may be dynamically updated as continuous signals are recorded by the sensors 102, processed by computer processor(s), and sent to the inference model(s) 106 for trained or inferred outputs, so that the system can provide a computer-generated representation of the visual character's movement that is updated in real-time in the XR environment.

Information generated in either system (e.g., XR camera inputs from an XR system, neuromuscular sensor inputs from a computer-based system that generates the musculoskeletal representation based on sensor data) can be used to improve the user experience, accuracy, feedback, inference models, calibration functions, and other aspects in the overall system. To this end, in an XR environment for example, system 100 may include an XR system that includes one or more of the following: processors, a camera (e.g., one or more camera(s) contained in a head-mounted display), a display (e.g., via XR glasses or other viewing device), or any other auxiliary sensor(s) that provides XR information within a view of the user or provides XR information to the user. In some embodiments, information from a camera contained in the head-mounted display in the XR system may be used in combination with information from the neuromuscular sensors to interpret movement, gestures, and/or actions performed by the user. System 100 may also include system elements that couple the XR system with a computer-based system that generates the musculoskeletal representation based on sensor data. For example, the systems may be coupled via a special-purpose or other type of computer system that receives inputs from the XR system and the system that generates the computer-based musculoskeletal representation. Such a system may include a gaming system, robotic control system, personal computer, or other system that is capable of interpreting XR and musculoskeletal information. The XR system and the system that generates the computer-based musculoskeletal representation may also be programmed to communicate directly. Such information may be communicated using any number of interfaces, protocols, or media.

In some embodiments, inference model 106 may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a gated recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some embodiments, the output of one or more inference models comprises one or more discrete outputs. Discrete outputs (e.g., classification labels) may be used, for example, when a user performs a particular gesture or causes a particular pattern of activation (including individual neural spiking events) to occur. For example, a model may be trained to estimate or infer whether the user is activating a particular motor unit, activating a particular motor unit with a particular timing, activating a particular motor unit with a particular firing pattern, or activating a particular combination of motor units. On a shorter timescale, discrete classification is used in some embodiments to estimate whether a particular motor unit fired an action potential within a given amount of time. In such embodiments, these estimates may then be accumulated to obtain an estimated firing rate for that motor unit.

In embodiments in which an inference model is implemented as a neural network configured to output a discrete signal, the neural network may include a softmax layer such that the outputs add up to one and may be interpreted as probabilities. The output of the softmax layer may be a set of values corresponding to a respective set of control signals, with each value indicating a probability that the user want to perform a particular control action. As one non-limiting example, the output of the softmax layer may be a set of three probabilities (e.g., 0.92, 0.05, and 0.03) indicating the respective probabilities that the detected pattern of activity is one of three known patterns.

It should be appreciated that when the inference model is a neural network configured to output a discrete output (e.g., a discrete signal), the neural network is not required to produce outputs that add up to one. For example, instead of a softmax layer, the output layer of the neural network may be a sigmoid layer (which does not restrict the outputs to probabilities that add up to one). In such embodiments, the neural network may be trained with a sigmoid cross-entropy cost. Such an implementation may be advantageous in the case when multiple different control actions may occur within a threshold amount of time and it is not important to distinguish the order in which these control actions occur (e.g., a user may activate two patterns of neural activity within the threshold amount of time). In some embodiments, any other suitable non-probabilistic multi-class classifier may be used, as aspects of the technology described herein are not limited in this respect.

In some embodiments, the output(s) of the inference model(s) may be continuous signals rather than discrete signals. For example, the model may output an estimate of the firing rate of each motor unit or the model may output a time-series electrical signal corresponding to each motor unit or sub-muscular structure.

It should be appreciated that aspects of the technology described herein are not limited to using neural networks, as other types of inference models may be employed in some embodiments. For example, in some embodiments, the inference model may comprise a hidden Markov model (HMM), a switching HMM with the switching allowing for toggling among different dynamic systems, dynamic Bayesian networks, and/or any other suitable graphical model having a temporal component. Any such inference model may be trained using recorded sensor signals.

As another example, in some embodiments, the inference model is a classifier taking as input, features derived from the recorded sensor signals. In such embodiments, the classifier may be trained using features extracted from the sensor data. The classifier may be a support vector machine, a Gaussian mixture model, a regression based classifier, a decision tree classifier, a Bayesian classifier, and/or any other suitable classifier, as aspects of the technology described herein are not limited in this respect. Input features to be provided to the classifier may be derived from the sensor data in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the classifier.

In some embodiments, values for parameters of the inference model may be estimated from training data. For example, when the inference model is a neural network, parameters of the neural network (e.g., weights) may be estimated from the training data. In some embodiments, parameters of the inference model may be estimated using gradient descent, stochastic gradient descent, and/or any other suitable iterative optimization technique. In embodiments where the inference model is a recurrent neural network (e.g., an LSTM), the inference model may be trained using stochastic gradient descent and backpropagation through time. The training may employ a cross-entropy loss function and/or any other suitable loss function, as aspects of the technology described herein are not limited in this respect.

As discussed above, some embodiments are directed to using an inference model for predicting musculoskeletal information based on signals recorded from wearable sensors. As discussed briefly above in the example where portions of the human musculoskeletal system can be modeled as a multi-segment articulated rigid body system, the types of joints between segments in a multi-segment articulated rigid body model constrain movement of the rigid body. Additionally, different human individuals tend to move in characteristic ways when performing a task that can be captured in inference patterns of individual user behavior. At least some of these constraints on human body movement may be explicitly incorporated into inference models used for prediction in accordance with some embodiments. Additionally or alternatively, the constraints may be learned by the inference model though training based on recorded sensor data, as discussed briefly above.

As discussed above, some embodiments are directed to using an inference model for predicting handstate information to enable the generation and/or real-time update of a computer-based musculoskeletal representation. The inference model may be used to predict the handstate information based on IMU signals, neuromuscular signals (e.g., EMG, MMG, and/or SMG signals), external device signals (e.g., camera or laser-scanning signals), or a combination of IMU signals, neuromuscular signals, and external device signals detected as a user performs one or more movements. For instance, as discussed above, a camera associated with an XR system may be used to capture actual position data relating to a human subject of the computer-based musculoskeletal representation and such actual position information may be used to improve the accuracy of the representation. Further, outputs of the inference model may be used to generate a visual representation of the computer-based musculoskeletal representation in an XR environment. For example, a visual representation of muscle groups firing, force being applied, text being entered via movement, or other information produced by the computer-based musculoskeletal representation may be rendered in a visual display of an XR system. In some embodiments, other input/output devices (e.g., auditory inputs/outputs, haptic devices, etc.) may be used to further improve the accuracy of the overall system and/or user experience.

Some embodiments of the technology described herein are directed to using an inference model, at least in part, to map one or more actions identified from the neuromuscular signals (e.g., map muscular activation state information identified from the neuromuscular sensors) to input signals including text. The inference model may receive as input IMU signals, neuromuscular signals (e.g., EMG, MMG, and/or SMG signals), external device signals (e.g., camera or laser-scanning signals), or a combination of IMU signals, neuromuscular signals, and external device signals detected as a user performs one or more sub-muscular activations, one or more movements, and/or one or more gestures. The inference model may be used to predict the input to be provided to the AR system without the user having to make perceptible movements.

Figure 2:
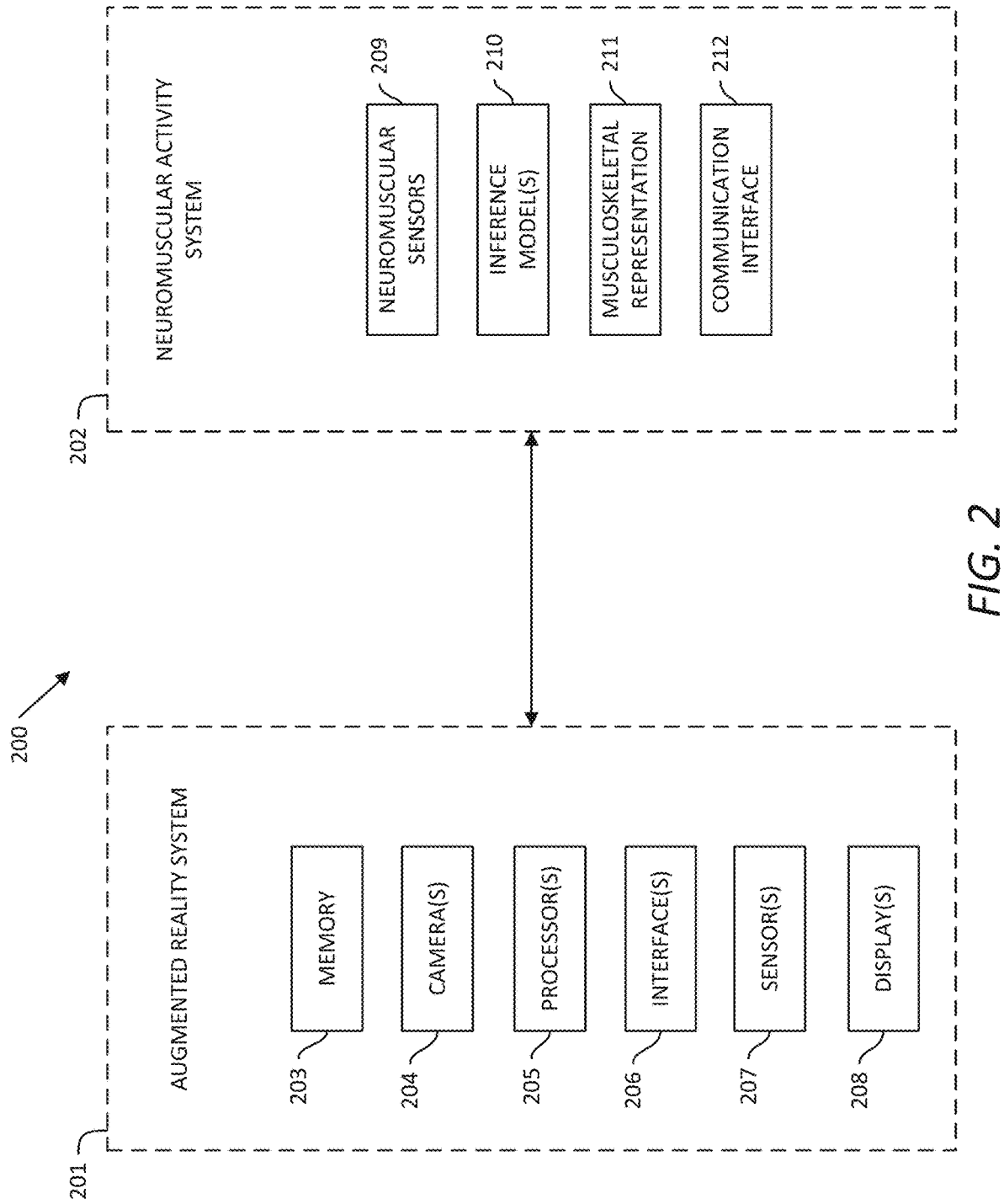
FIG. 2 is a schematic diagram of a distributed computer-based system that integrates an augmented reality (AR) system with a neuromuscular activity system in accordance with some embodiments of the technology described herein.

FIG. 2 illustrates a schematic diagram of a distributed computer-based system 200 that integrates an augmented reality (AR) system 201 with a neuromuscular activity system 202 in accordance with some embodiments. Neuromuscular activity system 202 is similar to system 100 described above with respect to FIG. 1.

Generally, an augmented reality (AR) system 201 may take the form of a pair of goggles, glasses, or other type(s) of device that shows display elements to the user that may be superimposed on "reality" which in some cases could be a user's view of the environment (e.g., as viewed through the user's eyes), or a captured (e.g., by cameras, for example) version of a user's view of the environment. In some embodiments, AR system 201 may include one or more cameras (e.g., camera(s) 204) mounted within a device worn by a user that captures one or more views experienced by the user in their environment. System 201 may have one or more processors 205 operating within the user device and/or within a peripheral device or computer system, and such processor(s) may be capable of transmitting and receiving video information and other types of sensor data.

AR system 201 may also include one or more sensors 207 such as microphones, GPS elements, accelerometers, infrared detectors, haptic feedback elements or any other type of sensor, or any combination thereof. In some embodiments, the AR system 201 may be an audio-based AR system and the one or more sensors 207 may also include one or more headphones or speakers. Further, AR system 201 may also have one or more displays 208 that permit the AR system to overlay and/or display information to the user in addition to the view of the user's environment presented by the AR system. AR system 201 may also include one or more communication interfaces (e.g. interfaces 206) for the purpose of communicating information to one or more computer systems (e.g., a gaming system or other systems capable of rendering or receiving AR data). AR systems can take many forms and are provided by a number of different manufacturers. For example, various embodiments may be implemented in association with one or more types of AR systems. For example, various embodiments may be implemented with the HoloLens holographic reality glasses available from the Microsoft Corporation, the Lightwear AR headset from Magic Leap, the Google Glass AR glasses available from Alphabet, the R-7 Smartglasses System available from ODG, or any other type of AR and/or VR device. Although discussed by way of example, it should be appreciated that one or more embodiments may be implemented within VR or XR systems.

AR system 201 may be operatively coupled to the neuromuscular activity system 202 through one or more communication methods, including but not limited to, the Bluetooth protocol, Wi-Fi, Ethernet-like protocols, or any number of connection types, wireless and/or wired. It should be appreciated that, for example, systems 201 and 202 may be directly connected or coupled through one or more intermediate computer systems or network elements. The double-headed arrow in FIG. 2 represents the communicative coupling between the systems 201 and 202.

Neuromuscular activity system 202 may be similar in structure and function to system 100 described above with reference to FIG. 1. In particular, system 202 may include one or more neuromuscular sensors 209 and/or auxiliary sensors described in connection with FIG. 1, one or more inference models 210, and may create, maintain, and store a musculoskeletal representation 211. In an example embodiment discussed above, system 202 may include a device such as a band that can be worn by a user in order to collect and analyze neuromuscular signals. Further, system 202 may include one or more communication interfaces 212 that permit system 202 to communicate with AR system 201, such as by Bluetooth, Wi-Fi, or other communication method. Notably, AR system 201 and neuromuscular activity system 202 may communicate information which can be used to enhance the user experience and/or allow the AR system to function more accurately and effectively.

Although FIG. 2 describes a distributed computer-based system that integrates the AR system 201 with the neuromuscular activity system 202, it will be understood the integration may be non-distributed in nature. In some embodiments, the neuromuscular activity system 202 may be integrated into the AR system 201 such that the various components of the neuromuscular activity system 202 may be considered as part of the AR system. For example, neuromuscular signals recorded by the neuromuscular sensors 209 may be treated as any other inputs (e.g., camera(s) 204, sensors 207) to the AR system 201. In addition, the processing of the sensor signals obtained from neuromuscular sensors 209 may be integrated into the AR system 201.

Figure 3:
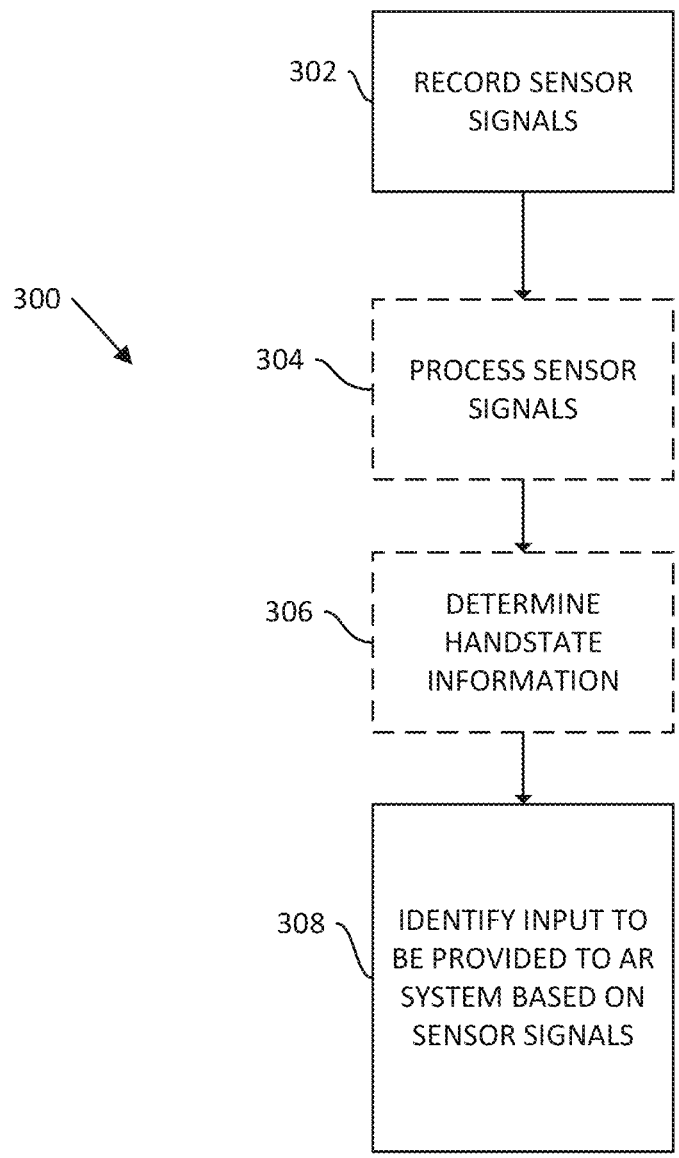
FIG. 3 is a flowchart of a process for providing input to an AR system in accordance with some embodiments of the technology described herein.
Figure 7A:
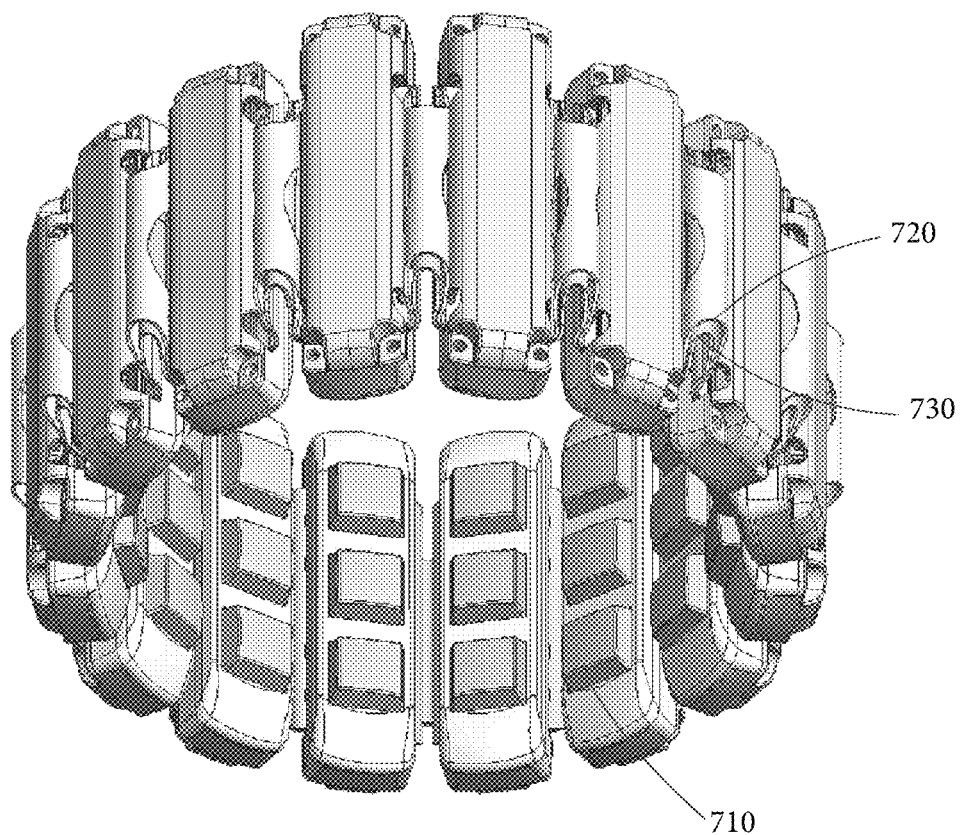
FIG. 7A illustrates a wearable system with sixteen EMG sensors arranged circumferentially around an elastic band configured to be worn around a user's lower arm or wrist, in accordance with some embodiments of the technology described herein.

FIG. 3 illustrates a process 300 for identifying and providing input to an XR system. In particular, process 300 is described with respect to identifying and providing input to an AR system, such as AR system 201, in accordance with some embodiments. The process 300 may be performed by the neuromuscular activity system 202. In act 302, sensor signals may be recorded by one or more sensors 102 (also referred to herein as "raw sensor signals") of the neuromuscular activity system 202. In some embodiments, the sensors include a plurality of neuromuscular sensors (e.g., EMG sensors) arranged on a wearable device worn by a user. For example, EMG sensors may be arranged on an elastic band configured to be worn around a wrist or forearm of the user to record neuromuscular signals from the user as the user performs various movements or gestures. In some embodiments, the EMG sensors may be the sensors 504 arranged on the band 502, as shown in FIG. 5; in some embodiments, the EMG sensors may be the sensors 710 arranged on the elastic band 720, as shown in FIG. 7A.

As used herein, the term "gestures" refers to a static or dynamic configuration of one or more body parts including the position of the one or more body parts and forces associated with the configuration. For example, gestures performed by the user include static/discrete gestures (also referred to as "pose") that indicate a static configuration of one or more body parts. For example, a pose can include a fist, an open hand, statically placing or pressing the palm of the hand down on a solid surface or grasping a ball. A pose can indicate the static configuration by providing positional information (e.g., segment coordinates, joint angles, or similar information) for the pose, or by providing an identifier corresponding to a pose (e.g., a parameter, function argument, or variable value). The gestures performed by the user may include dynamic/continuous gestures that indicate a dynamic configuration of one or more body parts. The dynamic configuration can describe the position of the one or mode body parts, the movement of the one or more body parts, and forces associated with the dynamic configuration. For example, a dynamic gesture can include waving a finger back and forth, throwing a ball or grasping and throwing a ball. Gestures may include covert gestures that are imperceptible to another person, such as slightly tensing a joint by co-contracting opposing muscles, or using sub-muscular activations. Gestures may be defined by an application configured to prompt a user to perform the gestures or, alternatively, gestures may be arbitrarily defined by a user. The gestures performed by the user may include symbolic gestures (e.g., gestures mapped to other gestures, interactions, or commands, for example, based on a gesture vocabulary that specifies the mapping). In some cases, hand and arm gestures may be symbolic and used to communicate according to cultural standards.

In some embodiments, the movements or gestures performed by the user may include tapping or typing actions such as, tapping or typing actions on a surface of a physical keyboard, tapping or typing actions on a surface that has a virtual keyboard projected thereon by the AR system 201, tapping or typing actions without any virtual representation of a keyboard and/or typing actions or other gestures performed in mid-air (e.g., not on a surface).

In some embodiments, the movements or gestures performed by the user may include writing actions such as, writing actions performed on a surface with a physical stylus, a physical writing implement, or fingertip or fingertips of the user (e.g., a user might be imagining that he is holding a pen or stylus by holding his fingertips together in a writing position), writing actions performed on a surface with a virtual stylus or virtual writing implement, and/or writing actions performed with a physical writing implement, a virtual writing implement, or fingertip(s) of the user in mid-air and not on a particular surface.

In some embodiments, the movements or gestures performed by the user may include drawing actions such as, drawing actions performed on a surface including drawing one or more line segments and/or curves and/or swiping through a virtual keyboard (e.g., virtual swipe keyboard) projected by the AR system 201.

In some embodiments, the movements or gestures performed by the user may include one-handed actions such as one-handed chord gestures including squeezes, taps or pinches with various fingers or combinations of fingers of one hand.

In addition to a plurality of neuromuscular sensors, some embodiments include one or more auxiliary sensors configured to record auxiliary signals that may also be provided as input to the one or more trained inference models. Examples of auxiliary sensors include IMU sensors, imaging devices, radiation detection devices (e.g., laser scanning devices), heart rate monitors, or any other type of biosensors configured to record biophysical information from the user during performance of one or more movements or gestures mentioned above. In some embodiments, the neuromuscular signals may be associated or correlated with information detected from the auxiliary sensors (e.g., auxiliary signals providing information indicative of a user's physiological state and/or behavior). For example, the auxiliary signals may be used together with the neuromuscular signals to interpret the user's movements, gestures, actions or otherwise augment and enhance the neuromuscular signals or the input identification process described in detail below.

Process 300 then proceeds to act 304, where the raw sensor signals recorded by the sensors 102 are optionally processed. In some embodiments, the raw sensor signals may be processed using hardware signal processing circuitry (e.g., to perform amplification, filtering, and/or rectification). In other embodiments, at least some signal processing of the raw sensor signals may be performed in software. Accordingly, signal processing of the raw sensor signals recorded by the sensors may be performed in hardware, software, or by any suitable combination of hardware and software. In some implementations, the raw sensor signals may be processed to derive other signal data. For example, accelerometer data recorded by one or more IMU sensors may be integrated and/or filtered to determine derived signal data associated with one or more muscles during activation of a muscle or performance of a gesture.

Process 300 then proceeds to act 306, where the raw sensor signals or the processed sensor signals are optionally provided as input to a trained inference model(s) configured to output information representing user activity, such as handstate information and/or muscular activation state information (e.g., a gesture or pose), as described above.

Process 300 then proceeds to act 308, where input to be provided to the AR system 201 is identified based on the raw sensor signals, the processed sensor signals, and/or the outputs of the trained inference model(s) (e.g., the handstate information). In some embodiments, input to be provided to the AR system 201 may be identified based on the movements, gestures, or actions identified from the raw sensor signals, the processed sensor signals, and/or the outputs of the trained inference model(s). For example, text input to be provided to the AR system 201 may be identified based on the tapping or typing actions, writing actions, drawing actions, and/or one-handed actions. Input other than or in addition to text input may be identified, for example, a drawing may be identified based on the drawing actions.

According to some embodiments, the one or more computer processors 104 of system 100 may be programmed to identify the input to be provided to the AR system 201 from signals recorded by sensors 102 (e.g., the raw sensor signals) and/or information based on these signals. The information based on the signals recorded by sensors 102 may include information associated with processed sensor signals (e.g., processed EMG signals) and/or information associated with outputs of the trained inference model (e.g., handstate information).

According to some embodiments, input to be provided to the AR system 201 may be identified based on signals output from the auxiliary sensors (e.g., one or more IMU sensors, one or more cameras or imaging devices associated with neuromuscular activity system 202 or augmented reality system 201) in addition to the signals recorded by the neuromuscular sensors. Such auxiliary sensors can provide additional information regarding the movement of the pen, stylus, fingertip(s), when the user performs the various movements, gestures and/or actions. The additional information can be used to improve the accuracy of the identification process.

In some embodiments, the identified input may be provided to the AR system 201. The AR system 201 may provide visual feedback by displaying an indication of the identified input to the user (and/or may provide other forms of feedback such as audio or haptic feedback). The visual feedback may facilitate text entry, for example, by prompting the user to adjust the way various movements, gestures, and/or actions are performed. The visual feedback may be useful in situations where the user provides input using an object or the user's hand/fingertip, which does not leave physical marks when writing or drawing on a surface, for example. In some embodiments, the indication of the identified input includes text input identified based on the tapping or typing actions, writing actions, drawing actions, and/or one-handed actions performed by the user. In some embodiments, the indication of the identified input includes a listing of one or more suggested or predicted words or phrases for text input. For example, multiple options, guesses or alternative words may be presented to the user. The user may select from among the presented items by, for example, performing certain movements or gestures (that are identified based on neuromuscular signals) or using alternative control schemes (e.g., a cursor/pointer). In some embodiments, the indication of the identified input includes one or more virtual ink marks associated with one or more strokes made by a writing implement. In some embodiments, the indication of the identified input includes a drawing identified based on drawing actions performed by the user. In some embodiments, the indication may be displayed via a user interface presented with an augmented reality environment provided by the AR system 201. For example, the indication may be provided on a virtual document in the user interface or as a representation shown in the AR environment to be floating in space. In some embodiments, the indication may be rendered onto a surface that the user is interacting with by the AR system 201. The indication may be rendered onto the surface where the user is typing, for example, as a scrolling tickertape or a line-oriented typewriter. The indication may be rendered onto the surface where the user is writing, for example, as virtual ink on the surface.

Figure 4:
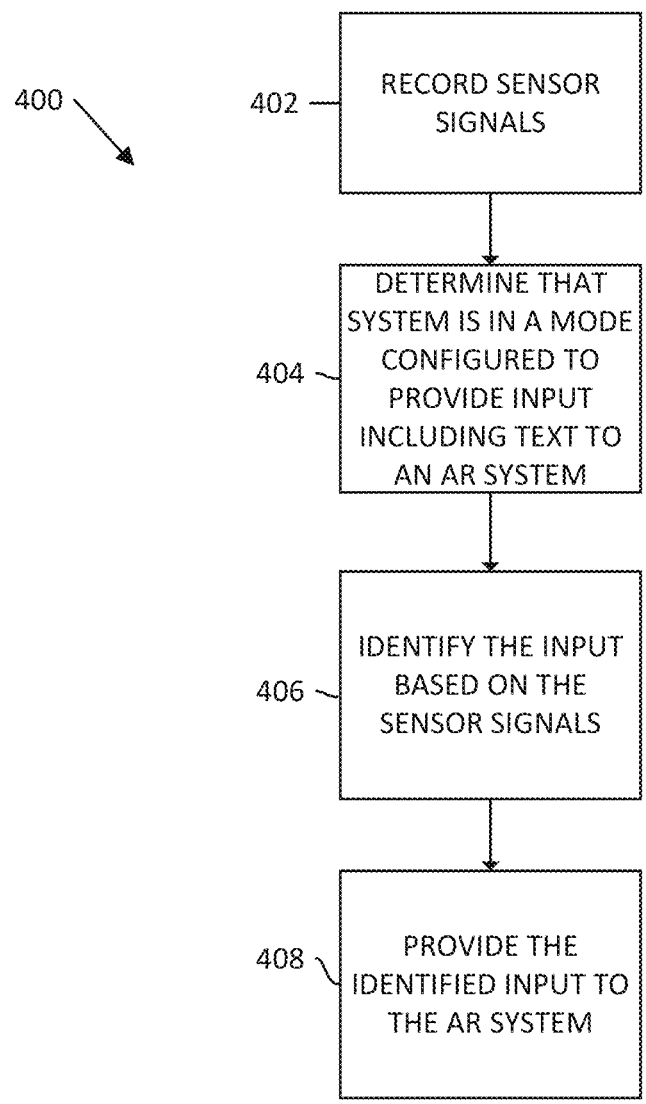
FIG. 4 is a flowchart of a process for providing input to an AR system based on one or more neuromuscular signals in accordance with some embodiments of the technology described herein.

FIG. 4 illustrates a process 400 for identifying and providing input to an XR system. In particular, process 400 is described with respect to identifying and providing input to an AR system, such as AR system 201, in accordance with some embodiments. The process 400 may be performed by the neuromuscular activity system 202. In act 402, sensor signals are recorded by one or more sensors such as neuromuscular sensors (e.g., EMG sensors) and/or auxiliary sensors (e.g., IMU sensors, imaging devices, radiation detection devices, heart rate monitors, or any other type of biosensors) of the neuromuscular activity system 202.

In act 404, a determination may be made that the neuromuscular activity system 202 is in a mode configured to provide input including text to the AR system 201. The mode may include a typing mode in which a user may perform tapping or typing actions on a physical or virtual keyboard to provide text input, a writing mode in which a user may perform writing actions with a physical or virtual writing implement (e.g., pen, stylus, etc.) and/or fingertip(s) to provide text input, a drawing mode in which a user may perform drawing actions with a physical or virtual writing implement (e.g., pen, stylus, etc.) and/or fingertip(s) to provide text and/or drawing input, a one-handed mode in which a user may perform one-handed actions to provide text input, and/or a mode in which discrete and/or continuous control signals may be provided as input to the AR system 201.

In some embodiments, the mode determination may be made based on a user selection of the mode. In other words, the mode that the neuromuscular activity system 202 is in may be determined in response to receiving a user selection of the mode. The user selection may be received from a user interface displayed in an AR environment provided by the AR system 201. The user interface may identify and display a number of modes from which the user may select a particular mode. For example, a list of available modes, such as, typing mode, writing mode, drawing mode, and/or one-handed mode may be provided and the user may select a mode from the list.

In some embodiments, the mode determination may be made based on the sensor signals and/or information based on the sensor signals. In other words, the mode that the neuromuscular activity system 202 is in may be determined based on the sensor signals and/or information based on the sensor signals. In one embodiment, a particular gesture performed by the user may be identified based on the sensor signals and/or information based on the sensor signals, and the mode may be determined by identifying the mode corresponding to the particular gesture. For example, different gestures may be mapped to different modes and a particular mode may be determined based on a corresponding gesture performed by the user. The mode entered based on a particular gesture or muscular activation state may depend on the state of the system (e.g., a current mode of the system) and/or may be personalized according to a user's preferred settings. In some embodiments, the mode may be determined as the user performs one or more actions associated with the corresponding mode. For example, when the user starts performing typing actions, the neuromuscular activity system 202 may be configured to recognize that the input mode is a typing mode and when the user starts performing writing actions, the neuromuscular activity system 202 may be configured to recognize that the input mode is a writing mode. The neuromuscular activity system 202 may switch from one mode to another mode based on detection of different actions performed by the user. For example, the user may switch between performing typing actions and writing actions and the system may determine that the input mode should switch between the typing mode and the writing mode accordingly without interrupting text entry.

In some embodiments, the mode determination may be made based on a signal received from the AR system 201. In other words, the neuromuscular activity system 202 may be configured to operate in a mode determined in response to receiving a signal from the AR system. The AR system 201 may generate the signal in response to detection of an event for which input within an AR environment provided by the AR system is desired. For example, text input may be desired to complete a portion of a form presented in a user interface displayed in the AR environment. Presentation of the form may trigger a signal to be generated by the AR system indicating that text input is desired. The signal may identify the various modes that are available for providing the input. The AR system 201 may communicate the signal to the neuromuscular activity system 202 and the neuromuscular activity system 202 may switch to particular available mode to provide the text input.

In act 406, the input to be provided to the AR system 201 may be identified based on the raw or processed signals and/or information based on the recorded signals (e.g., handstate and/or muscular activation state information). In some embodiments, the one or more computer processors of system 100 may be programmed to identify the input based on the sensor signals, the handstate information, detection of a gesture or muscular activation state, and/or a combination of any of the foregoing.

Figure 9A:
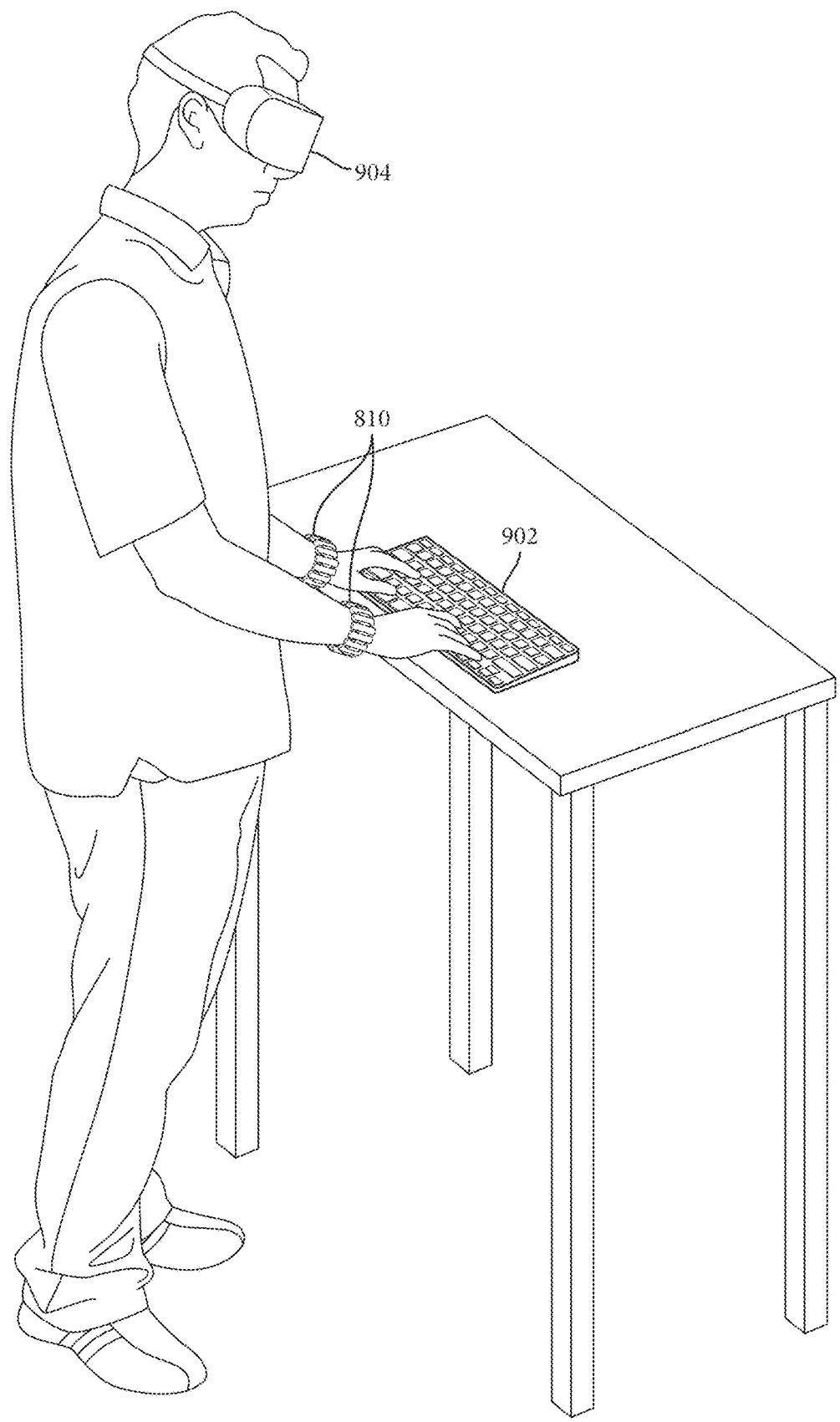
FIGS. 9A-9C depict exemplary scenarios in which user input may be provided to an XR system in accordance with some embodiments of the technology described herein.

In some embodiments, the input to be provided to the AR system 201 may be further identified based on the current mode of the neuromuscular activity system 202. When the neuromuscular activity system 202 is in a typing mode, input to be provided to the AR system 201 for the typing mode may be identified by identifying one or more tapping or typing actions performed by a user based on the sensor signals and/or information based on the sensor signals. For example, tapping or typing actions performed on a surface of a physical keyboard or a surface that has a virtual keyboard projected thereon by the AR system may be identified based on the sensor signals and text input for the typing mode may be identified based on the tapping/typing actions. FIG. 9A depicts a user performing typing actions on a physical keyboard 902 placed on a table. Input to be provided to the AR system may be identified based on the neuromuscular signals and/or muscular activation state(s) associated with these typing actions (as detected by wearable portion 810) and indications of the identified input may be displayed to the user via the virtual headset 904.

Figure 9B:
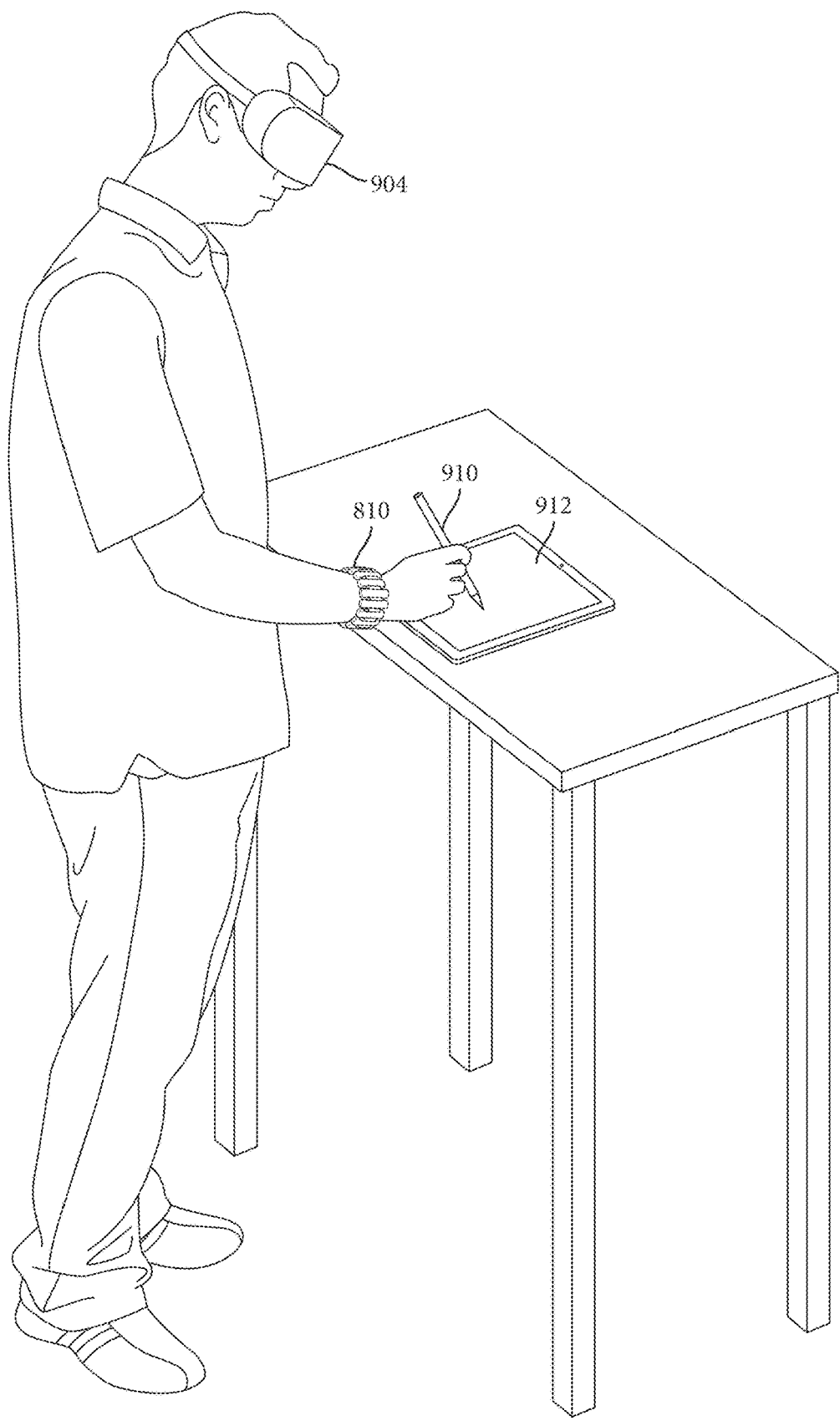

When the neuromuscular activity system 202 is in a writing mode, input to be provided to the AR system 201 for the writing mode may be identified by identifying one or more writing actions performed by the user based on the sensor signals and/or information based on the sensor signals. For example, writing actions performed on a surface with a physical writing implement, a virtual writing implement and/or fingertip(s) of the user may be identified based on the sensor signals and text input for the writing mode may be identified based on the writing actions. FIG. 9B depicts a user performing writing actions on an optional tablet device 912 using an optional stylus 910. Input to be provided to the AR system may be identified based on the neuromuscular signals and/or muscular activation state(s) associated with these writing actions (as detected by the wearable portion 810) and indications of the identified input may be displayed to the user via the virtual headset 904.

Figure 9C:
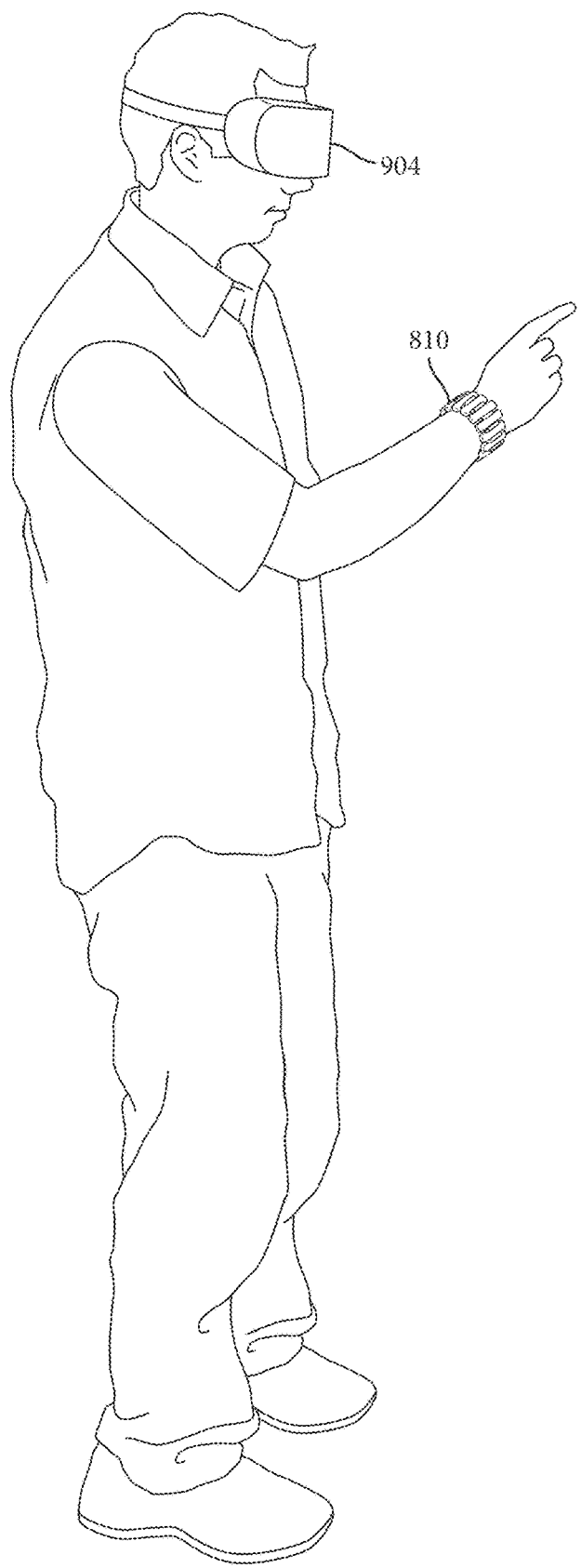

When the neuromuscular activity system 202 is in a drawing mode, input to be provided to the AR system for the drawing mode may be identified by identifying one or more drawing actions (e.g., drawing a number of line segments and/or curves on a surface) performed by the user based on the sensor signals and/or information based on the sensor signals. Input (e.g., text input and/or drawing input) for the drawing mode may be identified based on the drawing actions. In some embodiments, the input for the drawing mode may include one or more line segments and/or curves. In some embodiments, the input for the drawing mode may include input determined based on a sequence of pixel positions controlled by the drawing actions performed by the user. FIG. 9C depicts a user performing drawing actions mid-air (i.e., without using any writing instruments). Input to be provided to the AR system may be identified based on the neuromuscular signals and/or muscular activation state(s) associated with these drawing actions (as detected by wearable portion 810) and indications of the identified input may be displayed to the user via the virtual headset 904. In this scenario and other scenarios described herein, an auxiliary sensor (e.g., a camera) (not shown) may be provided as part of the virtual headset or as a separate component and may provide additional information (e.g., position of the hand) that may be used to further interpret the user actions and associated neuromuscular signals and/or muscular activation state(s).

In some embodiments, both the text input and the drawing may be identified based on the drawing actions performed by the user. In some implementations, processing of the sensor signals may be performed by multiple processors. The neuromuscular sensors may be configured to communicate at least some of the sensor signals to a first computer processor and a second computer processor, where drawings may be identified by the first computer processor and text input (e.g., handwriting) may be identified by the second computer processor. The text input and the drawing from the first and second computer processors may be combined such that the text overlays or annotates the drawing, or is stored as metadata for later processing (e.g., search and filtering). In other implementations, the drawing may be identified based on the drawing actions performed by the user and the text input may be identified from the drawing. For example, the drawing may be identified from the sensor signals and text may be identified from the drawing by running a handwriting recognition process on the drawing.

When the neuromuscular activity system 202 is in a one-handed mode (i.e., a mode where the user uses only one hand to provide input), input to be provided to the AR system for the one-handed mode may be identified by identifying one or more one-handed actions (for example, squeezing, pinching, and/or tapping of various fingers and combinations of fingers) performed by the user based on the sensor signals and/or information based on the sensor signals. Text input for the one-handed mode may be identified based on the one-handed actions.

In some embodiments, one or more gestures may be identified in addition to the typing/tapping, writing, drawing, and/or one-handed actions to allow editing and/or correction of identified text. For example, one or more delete gestures may be recognized in addition to writing actions (based on which text input is identified) that allow deletion of identified letters or words in the text input. The one or more delete gestures may include a gesture to delete a single letter, a gesture to delete a previous word, and/or a gesture to delete a selected word. In some embodiments, the selection of the word to be deleted may be accomplished using neuromuscular controls, for example, cursor navigation. The one or more delete gestures may involve manipulating an object being held by a user (e.g., a stylus or pencil). For example, the one or more delete gestures may include flipping the object, such as a pencil, to an eraser position and then swiping or pressing an imaginary button on the object with a particular finger to initiate deletion of one or more letters or words.

In some embodiments, one or more gestures (such as newline gestures that indicate the end of a line of text and start of a new line of text, space gestures that indicate a space break in text, and/or other gestures) may be identified and combined with recognizing text input to allow the user to compose longer sequences of text without having to physically move his hand (e.g., to the right or down a virtual page in a virtual document). For example, a swipe or flick in a particular direction may be used as a newline gesture and a "pen up" motion may be used for space or word breaks.

In act 408, the input identified in act 406 may be provided to the AR system 201. Text input and/or drawing input identified based on the sensor signals and/or information based on the sensor signals may be provided to the AR system 201. The one or more computer processors of system 100 may identify and provide the input to the AR system.

In some embodiments, the neuromuscular activity system 202 may switch between different modes, for example typing, writing, drawing, and/or one-handed modes, for providing input. For example, a user may provide text-based input by tapping on a surface of a physical keyboard, writing on a surface with a stylus, swiping though a virtual swipe keyboard projected in the AR environment, or using a custom movement-free mapping from neuromuscular signals to text. These different approaches may all be integrated with the AR system 201 though a common application programming interface (API). In other words, the different forms of text input may be identified by the neuromuscular activity system 202 and provided to the AR system 201, where the AR system receives the different forms of text input via a common text API.

In some embodiments, the input to be provided to the AR system 201 may be identified from multiple sources, where the sources may include the neuromuscular signals and at least one source other than the neuromuscular signals. For example, the at least one source may include a physical input device such as a physical keyboard or stylus. Input received from the multiple sources may be combined and the combined input may be provided to the AR system 201. In some implementations, the common API may receive input from the multiple sources. In some embodiments, visual feedback provided by the AR system may continue regardless of the source, the mode or the form of text entry.

In some embodiments, when used in combination with physical input devices, the neuromuscular activity system 202 may learn to emulate the physical input devices using the neuromuscular signals, thereby allowing seamless switching between the physical input devices and their virtual emulations.

FIG. 7A illustrates a wearable system with sixteen neuromuscular sensors 710 (e.g., EMG sensors) arranged circumferentially around an elastic band 720 configured to be worn around a user's lower arm or wrist. As shown, EMG sensors 710 are arranged circumferentially around elastic band 720. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

Figure 7B:
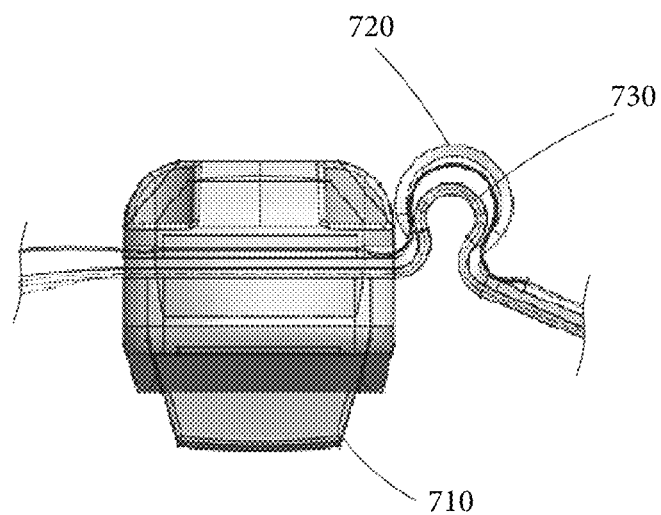
FIG. 7B is a cross-sectional view through one of the sixteen EMG sensors illustrated in FIG. 7A.

In some embodiments, sensors 710 include a set of neuromuscular sensors (e.g., EMG sensors). In other embodiments, sensors 710 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 710 may be coupled together using flexible electronics 730 incorporated into the wearable device. FIG. 7B illustrates a cross-sectional view through one of the sensors 710 of the wearable device shown in FIG. 7A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 710 are discussed in more detail below in connection with FIGS. 8A and 8B.

Figures 8A, 8B:
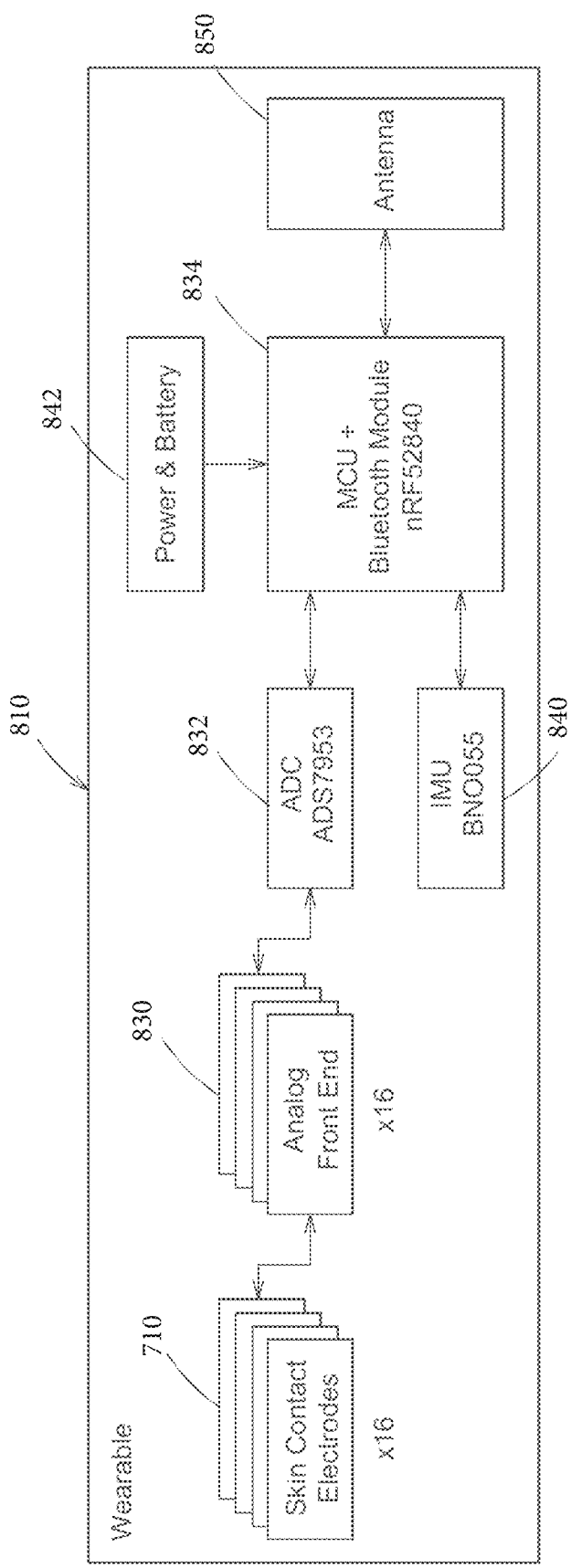
FIGS. 8A and 8B schematically illustrate components of a computer-based system on which some embodiments are implemented.

FIGS. 8A and 8B illustrate a schematic diagram with internal components of a wearable system with sixteen EMG sensors, in accordance with some embodiments of the technology described herein. As shown, the wearable system includes a wearable portion 810 (FIG. 8A) and a dongle portion 820 (FIG. 8B) in communication with the wearable portion 810 (e.g., via Bluetooth or another suitable short range wireless communication technology). As shown in FIG. 8A, the wearable portion 810 includes the sensors 710, examples of which are described in connection with FIGS. 7A and 7B. The output of the sensors 710 is provided to analog front end 830 configured to perform analog processing (e.g., noise reduction, filtering, etc.) on the recorded signals. The processed analog signals are then provided to analog-to-digital converter 832, which converts the analog signals to digital signals that can be processed by one or more computer processors. An example of a computer processor that may be used in accordance with some embodiments is microcontroller (MCU) 834 illustrated in FIG. 8A. As shown, MCU 834 may also include inputs from other sensors (e.g., IMU sensor 840), and power and battery module 842. The output of the processing performed by MCU may be provided to antenna 850 for transmission to dongle portion 820 shown in FIG. 8B.

Dongle portion 820 includes antenna 852 configured to communicate with antenna 850 included as part of wearable portion 810. Communication between antenna 850 and 852 may occur using any suitable wireless technology and protocol, non-limiting examples of which include radiofrequency signaling and Bluetooth. As shown, the signals received by antenna 852 of dongle portion 820 may be provided to a host computer for further processing, display, and/or for effecting control of a particular physical or virtual object or objects.

Although the examples provided with reference to FIGS. 7A, 7B and FIGS. 8A, 8B are discussed in the context of interfaces with EMG sensors, it is understood that the techniques described herein for reducing electromagnetic interference can also be implemented in wearable interfaces with other types of sensors including, but not limited to, mechanornyography (MMG) sensors, sonomyography (SMG) sensors, and electrical impedance tomography Elf) sensors. In addition, it will be understood that techniques described herein for providing input to an AR system can also be implemented within VR, MR or XR systems.

It will be appreciated that the disclosure is not limited to the use of typing, writing, drawing, and/or one-handed modes or identifying input based on tapping/typing actions, writing actions, drawing actions, and/or one-handed actions, and other modes or actions can be used. For example, two-handed actions other that typing, tapping, writing, or drawing on a surface, such as, combinations of fingertip squeezes, hand gestures, or finger movements on both hands may be used without departing from the scope of this disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

The foregoing features may be used, separately or together in any combination, in any of the embodiments discussed herein.

Further, although advantages of the present invention may be indicated, it should be appreciated that not every embodiment of the invention will include every described advantage. Some embodiments may not implement any features described as advantageous herein. Accordingly, the foregoing description and attached drawings are by way of example only.

Variations on the disclosed embodiment are possible. For example, various aspects of the present technology may be used alone, in combination, or in a variety of arrangements not specifically discussed in the embodiments described in the foregoing, and therefore they are not limited in application to the details and arrangements of components set forth in the foregoing description or illustrated in the drawings. Aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The indefinite articles "a" and "an," as used herein in the specification and in the claims, unless clearly indicated to the contrary, should be understood to mean "at least one."

Any use of the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Any use of the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An artificial reality system, comprising:
a head-mounted display that includes a display; and
a wrist-wearable device, in communication with the head-mounted display, that includes a band and a plurality of distinct sets of neuromuscular sensors, integrated into an inner surface the band, configured to detect neuromuscular signals from a wrist of a user of the wrist-wearable device when the wrist-wearable device is donned on the wrist of the user, wherein the plurality of distinct sets of neuromuscular sensors are positioned to be arranged circumferentially around the inner surface of the band;
wherein the head-mounted display is configured to:
at a first time:
receive, from the wrist-wearable device, data representing a first sequence of neuromuscular signals gathered from the user and generated by the user as a result of the user performing a first gesture;
associate the first sequence of neuromuscular signals with a known action;
determine, based on the known action, which state the artificial reality system is currently in and further determine one or more personalization settings governing which actions lead to specific modes of operation;
based on both the current state of the artificial reality system and the determined personalization settings governing which associated actions lead to which specified modes of operation, enter a first mode of operation that is associated with the known action; and display, on the display, an indication that the first mode is active, wherein the indication that the first mode is active comprises text input based on the known action; and at a second time after the first time:

receive, from the wrist-wearable device, subsequent data representing a second sequence of neuromuscular signals gathered from the user and generated by the user as a result of the user performing a second gesture;

associate the second sequence of neuromuscular signals with a different known action;

determine, at the second time and based on the different known action, that the artificial reality system is in the first mode;

based on the current state of the artificial reality system at the second time, the determined personalization settings, and the different known action, enter a second mode of operation, different from the first mode of operation, that is associated with the different known action; and display, on the display, an indication that the second mode is active, wherein displaying the indication that the second mode is active comprises displaying handwriting input based on the different known action.

2. The artificial reality system of claim 1, wherein at least one of the first mode or the second mode comprises a typing mode in which the head-mounted display is configured to identify one or more tapping or typing actions based, at least in part, on at least one of the first sequence of neuromuscular signals or the second sequence of neuromuscular signals.

3. The artificial reality system of claim 1, wherein at least one of the first mode or the second mode comprises a writing mode in which the head-mounted display identifies one or more writing actions detected from the user based, at least in part, on at least one of the first sequence of neuromuscular signals or the second sequence of neuromuscular signals.

4. The artificial reality system of claim 1, wherein at least one of the first mode or the second mode comprises a drawing mode in which the head-mounted display is configured to identify one or more drawing actions detected from the user based, at least in part, on at least one of the first sequence of neuromuscular signals or the second sequence of neuromuscular signals.

5. The artificial reality system of claim 1, wherein at least one of the first mode or the second mode comprises a one-handed mode in which the head-mounted display identifies one or more one-handed actions detected from the user based, at least in part, on at least one of the first sequence of neuromuscular signals or the second sequence of neuromuscular signals.

6. The artificial reality system of claim 1, wherein the text input is identified based on one or more typing actions, tapping actions, writing actions, drawing actions, or one-handed actions detected from the user.

7. The artificial reality system of claim 1, wherein displaying the indication that the first mode is active comprises listing one or more suggested or predicted words or phrases for text input.

8. The artificial reality system of claim 1, wherein displaying the indication that the first mode is active comprises displaying one or more virtual ink marks based on the known action.

9. The artificial reality system of claim 1, wherein displaying the indication that the first mode is active comprises displaying a drawing based on the known action.

10. The artificial reality system of claim 1, wherein displaying the indication that the first mode is active comprises displaying the indication via a user interface presented within an augmented reality environment provided by the artificial reality system.

11. The artificial reality system of claim 1, wherein displaying the indication that the first mode is active further comprises rendering the indication onto a physical surface that the user is interacting with to provide input to the artificial reality system.

12. The artificial reality system of claim 1, further comprising an additional wrist-wearable device configured to detect neuromuscular signals from a different wrist of the user.

13. The artificial reality system of claim 1, wherein displaying the indication that the first mode is active comprises prompting the user to adjust a way that the first gesture is performed.

14. The artificial reality system of claim 1, wherein the known action is selected from the group consisting of: a writing action, a typing action, a tapping action, a drawing action, a one-handed action, a fingertip squeeze action, a pinching action, or a finger movement.

15. The artificial reality system of claim 14, wherein the different known action is selected from the group consisting of: a writing action, a typing action, a tapping action, a drawing action, a one-handed action, a fingertip squeeze action, a pinching action, or a finger movement.

16. The artificial reality system of claim 1, wherein the first gesture and the second gesture are defined by the user.

17. The artificial reality system of claim 1, wherein:
the first gesture comprises a text input gesture, wherein the head-mounted display is configured to display text in response to the user performing the text input gesture; and
the second gesture comprises a delete gesture, wherein the head-mounted display is configured to delete text in response to the user performing the delete gesture.

18. The artificial reality system of claim 17, wherein the text input gesture comprises a typing gesture, a tapping gesture, or a writing gesture.

19. The artificial reality system of claim 1, wherein the head-mounted display further includes an auxiliary sensor configured to identify at least a position of a hand of the user, wherein the head-mounted display is further configured to use the position of the hand of the user to identify the known action and the different known action.

20. The artificial reality system of claim 19, wherein the auxiliary sensor comprises a camera.

21. The artificial reality system of claim 19, wherein the auxiliary sensor comprises at least one inertial measurement unit sensor.

22. The artificial reality system of claim 1, wherein the plurality of distinct sets of neuromuscular sensors comprises sixteen distinct sets of neuromuscular sensors.

23. The artificial reality system of claim 1, wherein the band comprises an elastic band.

24. The artificial reality system of claim 1, wherein the neuromuscular sensors comprise at least one of: electromyography sensors, mechanomyography sensors, or sonomyography sensors.

25. The artificial reality system of claim 1, wherein the head-mounted display is further configured to, at a third time after the second time:

receive, from the wrist-wearable device, additional subsequent data representing a third sequence of neuromuscular signals gathered from the user and generated by the user as a result of the user performing a third gesture;

associate the third sequence of neuromuscular signals with an additional different known action;

enter a third mode of operation that is associated with the additional different known action; and display, on the display, an indication that the third mode is active.

26. The artificial reality system of claim 1, wherein the head-mounted display is further configured to generate a signal to cause the artificial reality system to enter the first mode.

27. The artificial reality system of claim 26, wherein the signal is generated in response to detection of an event for which input to the artificial reality system is to be received.

28. The artificial reality system of claim 27, wherein the head-mounted display is further configured to display potential modes for providing the input.

29. A method for receiving input in an artificial reality system, the method comprising:

at a first time:

receiving, at a head-mounted display and using one or more distinct sets of neuromuscular sensors arranged circumferentially around an inner surface of a band of a wrist-wearable device, a first sequence of neuromuscular signals gathered from the user and generated by the user as a result of the user performing a first gesture;

associating the first sequence of neuromuscular signals with a first action;

determining, based on the known action, which state the artificial reality system is currently in and further determine one or more personalization settings governing which actions lead to specific modes of operation;

based on both the current state of the artificial reality system and the determined personalization settings governing which associated actions lead to which specified modes of operation, entering a first mode of operation that is associated with the first action; and displaying on the head-mounted display an indication that the first mode is active, wherein the indication that the first mode is active comprises text input based on the known actions; and at a second time after the first time:

receiving, from the wrist-wearable device, subsequent data representing a second sequence of neuromuscular signals gathered from the user and generated by the user as a result of the user performing a second gesture;

associating the second sequence of neuromuscular signals with a second, different action;

determining, at the second time and based on the different known action that the artificial reality system is in the first mode;

based on the current state of the artificial reality system at the second time, the determined personalization settings, and the different known action, entering a second mode of operation, different from the first mode of operation, that is associated with the second, different action; and display, on the head-mounted display, an indication that the second mode is active, wherein displaying the indication that the second mode is active comprises displaying handwriting input based on the different known action.

30. The method of claim 29, wherein at least one of the first mode or the second mode is selected from the group consisting of a typing mode, a writing mode, and a drawing mode.

31. A wrist-wearable device, comprising:

a communication element configured for communication with a head-mounted display;

a band comprising an inner surface positioned to be against a user's arm when the band is donned on the user's arm; and a plurality of distinct sets of neuromuscular sensors integrated into and positioned circumferentially around the inner surface of the band;

wherein the wrist-wearable device is configured to:

at a first time:

transmit, via the communication element and to the head-mounted display, data representing a first sequence of neuromuscular signals generated by the user as a result of the user performing a first gesture with a hand associated with the user's arm to input data to the head-mounted display in a first mode, the transmitted data causing the head-mounted display to determine, based on an identified action, which state the head-mounted display is currently in and further determine one or more personalization settings governing which actions lead to specific modes of operation and, based on both the current state of the head-mounted display and the determined personalization settings governing which associated actions lead to which specified modes of operation, enter a first mode of operation that is associated with the identified action and display an indication that the first mode is active including displaying text input based on the identified action; and at a second time:

transmit, via the communication element and to the head-mounted display, data representing a second sequence of neuromuscular signals generated by the user as a result of the user performing a second, different gesture with the hand associated with the user's arm to input data to the head-mounted display in a second mode, the data representing the second sequence of neuromuscular signals causing the head-mounted display to determine, at the second time and based on a different identified action that the head-mounted display is in the first mode and, based on the current state of the head-mounted display, the determined personalization settings, and the different identified action, enter a second mode of operation, different from the first mode of operation, that is associated with the different identified action and display an indication that the second mode of operation is active including displaying handwriting input based on the different identified action.

\* \* \* \* \*